US009904382B2

(12) United States Patent
Ando et al.

(10) Patent No.: US 9,904,382 B2
(45) Date of Patent: Feb. 27, 2018

(54) REAR PIEZOELECTRIC OPERATION INPUT DEVICE AND FRONT INFORMATION DISPLAY DEVICE

(71) Applicant: MURATA MANUFACTURING CO., LTD., Nagaokakyo-Shi (JP)

(72) Inventors: Masamichi Ando, Nagaokakyo (JP); Kazuhiko Yamano, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 14/521,653

(22) Filed: Oct. 23, 2014

(65) Prior Publication Data

US 2015/0042590 A1 Feb. 12, 2015

Related U.S. Application Data

(63) Continuation of application No. PCT/JP2013/061827, filed on Apr. 23, 2013.

(30) Foreign Application Priority Data

Apr. 27, 2012 (JP) ................... 2012-102632

(51) Int. Cl.
*G06F 3/01* (2006.01)
*G06F 3/041* (2006.01)
(Continued)

(52) U.S. Cl.
CPC .............. *G06F 3/041* (2013.01); *G06F 1/169* (2013.01); *G06F 3/016* (2013.01); *G06F 3/0354* (2013.01); *G06F 1/1656* (2013.01); *G06F 3/044* (2013.01)

(58) Field of Classification Search
CPC ........ G06F 3/041; G06F 3/0354; G06F 3/044; G06F 3/0412; G06F 3/0414; G06F 3/03547; G06F 1/169; G06F 3/016; G06F 1/1656

See application file for complete search history.

(56) References Cited

U.S. PATENT DOCUMENTS 5,515,738 A * 5/1996 Tamori ...................... G01L 1/16
310/338
8,698,764 B1 * 4/2014 Karakotsios .......... G06F 1/1692
345/173

(Continued)

FOREIGN PATENT DOCUMENTS

JP 2010-108061 A 5/2010
JP 2010-108490 A 5/2010
(Continued)

OTHER PUBLICATIONS

Written Opinion and International Search Report issued in PCT/JP2013/061827, dated Jun. 4, 2013.
(Continued)

*Primary Examiner* — Darlene M Ritchie
(74) *Attorney, Agent, or Firm* — Arent Fox LLP

(57) ABSTRACT

An operation input device has a housing including a concave portion in which an information display device is accommodated. A piezoelectric element of a flat film shape and a control IC connected to the piezoelectric element are built in a base portion of the housing. The control IC is connected to a device IC of the information display device. When a user's finger touches an attachment region of the piezoelectric element in the base portion of the housing, a detection signal corresponding to the touch position and a pressing amount is outputted from the piezoelectric element. The control IC generates operation information based on the detection signal, and outputs the operation information to the device
(Continued)

IC of the information display device. The device IC shows display corresponding to the operation information.

17 Claims, 18 Drawing Sheets

(51) Int. Cl.
*G06F 3/044* (2006.01)
*G06F 1/16* (2006.01)
*G06F 3/0354* (2013.01)

(56) References Cited

U.S. PATENT DOCUMENTS

| | | | | |
|---|---|---|---|---|
| 9,128,547 B2* | 9/2015 | Kodani | | G06F 3/041 |
| 9,740,288 B2* | 8/2017 | Hiraoka | | G06F 3/016 |
| 2003/0184528 A1* | 10/2003 | Kawasaki | | G02F 1/13338 |
| | | | | 345/173 |
| 2003/0234768 A1* | 12/2003 | Rekimoto | | G06F 3/0488 |
| | | | | 345/169 |
| 2004/0049743 A1* | 3/2004 | Bogward | | G06F 1/162 |
| | | | | 715/262 |
| 2006/0197753 A1* | 9/2006 | Hotelling | | G06F 1/1626 |
| | | | | 345/173 |
| 2007/0103454 A1* | 5/2007 | Elias | | G06F 1/1626 |
| | | | | 345/173 |
| 2010/0149129 A1 | 6/2010 | Homma et al. | | |
| 2010/0321335 A1 | 12/2010 | Lim et al. | | |
| 2011/0057889 A1 | 3/2011 | Sakatsume | | |
| 2011/0102343 A1* | 5/2011 | Imai | | G06F 1/1643 |
| | | | | 345/173 |
| 2012/0007822 A1 | 1/2012 | Luo | | |
| 2012/0068965 A1 | 3/2012 | Wada et al. | | |
| 2012/0075221 A1* | 3/2012 | Yasuda | | B32B 37/02 |
| | | | | 345/173 |
| 2012/0075226 A1* | 3/2012 | Andoh | | G06F 3/046 |
| | | | | 345/173 |
| 2012/0092293 A1* | 4/2012 | Ganapathi | | G02B 26/0833 |
| | | | | 345/174 |
| 2012/0146945 A1 | 6/2012 | Miyazawa et al. | | |
| 2012/0162143 A1* | 6/2012 | Kai | | G06F 1/1626 |
| | | | | 345/177 |
| 2012/0249413 A1* | 10/2012 | Sugahara | | G09G 5/00 |
| | | | | 345/156 |
| 2012/0274599 A1* | 11/2012 | Schediwy | | G06F 3/016 |
| | | | | 345/174 |
| 2012/0299872 A1 | 11/2012 | Nishikawa et al. | | |
| 2012/0306790 A1* | 12/2012 | Kyung | | G06F 3/016 |
| | | | | 345/173 |
| 2013/0009882 A1* | 1/2013 | Salmela | | G06F 3/016 |
| | | | | 345/173 |
| 2013/0057499 A1* | 3/2013 | Ando | | G06F 3/038 |
| | | | | 345/173 |
| 2013/0123014 A1* | 5/2013 | Ito | | G06F 1/1626 |
| | | | | 463/37 |
| 2013/0328820 A1* | 12/2013 | Kondoh | | G06F 1/1656 |
| | | | | 345/173 |
| 2013/0342432 A1* | 12/2013 | Schneider | | G09G 3/3493 |
| | | | | 345/89 |
| 2014/0002355 A1* | 1/2014 | Lee | | G06F 1/1626 |
| | | | | 345/156 |
| 2014/0145836 A1* | 5/2014 | Tossavainen | | G06F 3/016 |
| | | | | 340/407.2 |
| 2014/0152618 A1 | 6/2014 | Ando | | |
| 2014/0339724 A1 | 11/2014 | Yoshida et al. | | |
| 2015/0296062 A1* | 10/2015 | Lee | | G02F 1/133345 |
| | | | | 455/566 |
| 2016/0188181 A1* | 6/2016 | Smith | | G06F 3/048 |
| | | | | 715/765 |
| 2016/0291731 A1* | 10/2016 | Liu | | G06F 1/1656 |

FOREIGN PATENT DOCUMENTS

| | | |
|---|---|---|
| JP | 2010-140417 A | 6/2010 |
| JP | 2011-003188 A | 1/2011 |
| JP | 2011-053831 A | 3/2011 |
| JP | 2012-027765 A | 2/2012 |
| JP | 2012-056239 A | 3/2012 |
| JP | 2012-064108 A | 3/2012 |
| WO | WO-2009/031213 A1 | 3/2009 |
| WO | WO-2010-143528 A1 | 12/2010 |
| WO | WO-2011/071096 A1 | 6/2011 |
| WO | WO-2012/026494 A1 | 3/2012 |
| WO | WO-2013/021835 A1 | 2/2013 |

OTHER PUBLICATIONS

Tsuneo Murata; "Development of a sensor device using a high transparency organic piezoelectric film"; Japan, Murata Manufacturing Company, Ltd., Sep. 21, 2011, URL http://www.murata.co.jp/new/news_release/2011/0921.

Japanese Office Action issued for counterpart application JP 2014-512590, dated Dec. 2, 2014 (with English translation).

* cited by examiner (A)

(B)

(A)

(B)

(A)

(B)

REAR PIEZOELECTRIC OPERATION INPUT DEVICE AND FRONT INFORMATION DISPLAY DEVICE

CROSS REFERENCE TO RELATED APPLICATIONS

The present application is a continuation of PCT/JP2013/061827 filed Apr. 23, 2013, which claims priority to Japanese Patent Application No. 2012-102632, filed Apr. 27, 2012, the entire contents of each of which are incorporated herein by reference.

FIELD OF THE INVENTION

The present invention relates to an operation input device which inputs an operation to a portable information display device such as smartphones.

BACKGROUND OF THE INVENTION

Recently, various types of information display devices such as smartphones and tablet computers which users hold by the hands to check displayed information are devised.

Such an information display device generally receives an input of an operation from a user's finger while the user holds the information display device body by the hand. Further, as this operation input means, a touch panel which is overlaid and arranged on a flat display on a surface of the information display device is usually used. In this case, the user touches the touch panel on a display screen by the finger to input an operation.

Further, conventionally, information display devices which each have a touch panel on a display screen as well as a touch pad on a back surface side are also devised as disclosed in, for example, Patent Literatures 1 and 2.

The touch pads on the back surface side of the information display devices disclosed in Patent Literatures 1 and 2 are used for auxiliary input of an operation through the touch panel on the top surface side.

Patent Literature 1: Japanese Patent Application Laid-Open No. 2010-108061

Patent Literature 2: Japanese Patent Application Laid-Open No. 2010-140417

As described above with reference to the conventional technique, the information display device mainly receives an input of an operation through the touch panel on the surface, and the touch panel is frequently touched and therefore is very likely to become dirty due to a finger oil and visibility of the display screen lowers. Further, to prevent the touch panel from becoming dirty, wiping stains on the display screen needs to be frequently performed and is bothersome for users.

Furthermore, a conventional technique has difficulty in realizing a complex operation input using the touch pad on the back surface side in the information display device which has a touch pad on the back surface side unlike the touch panel on the top surface side. Still further, a more complex detection mechanism is required to enable such a complex operation input, and therefore the information display device becomes larger.

SUMMARY OF THE INVENTION

It is therefore an object of the present invention to provide an operation input device which can reduce stains on a display screen of an information display device even when a user inputs an operation holding the information display device by the hand, and can input the operation similar to a conventional information display device which receives an input of an operation through a surface.

The present invention relates to an operation input device which inputs an operation to an information display device which includes on a top surface side a display unit which displays information corresponding to an operation input, and has the following features. The operation input device has a piezoelectric element of a flat film shape, and an operation information generating unit. The piezoelectric element of the flat film shape includes a piezoelectric film including opposing first primary surface and second primary surface, a first electrode formed in the first primary surface and a second electrode formed in the second primary surface, and the piezoelectric element of the flat film shape which generates a detection signal corresponding to a pressing position.

The operation information generating unit generates operation input information from the detection signal. Further, at least the piezoelectric element of the flat film shape is arranged on a back surface side of the information display device.

According to this configuration, the piezoelectric element of the flat film shape arranged on the back surface side of the information display device can detect a pressing position and a pressing force. Consequently, it is possible to not only simply detect an operation but also create operation information based on two types of parameters of a position and a pressing force, and, as a result, to realize more various pieces of operation input information only by operating the piezoelectric element of the flat film shape in the back surface.

Further, the first electrode and the second electrode of the operation input device according to the present invention are preferably formed by a capacitance detection electrode and a piezoelectric voltage detection electrode.

According to this configuration, a detected position and a detected pressing force can be obtained from individual detection signals. Consequently, it is possible to easily and reliably obtain two pieces of operation information.

Further, the piezoelectric film of the operation input device according to the present invention is preferably made of polylactic acid stretched (referred to simply as "uniaxially stretched" below) in at least a uniaxial direction.

This configuration indicates an example of a suitable material for the piezoelectric film. The uniaxially stretched polylactic acid has a relatively high piezoelectric constant and a low dielectric constant, and therefore has a high piezoelectric output constant. Consequently, detection sensitivity for the pressing amount of a touch is increased by using polylactic acid for the piezoelectric film. Consequently, even the configuration including only one piezoelectric film can more precisely detect both of a touch position and a pressing force than a structure in which conventional capacitance detection touch panel and pressure-sensitive sensor are overlaid. Further, polylactic acid does not have pyroelectricity, and therefore, when a finger or the like touches the touch panel surface, transfer of a body temperature does not influence a detection voltage of the pressing amount (pressing force). Hence, when use of polylactic acid as the piezoelectric film is compared to use of a piezoelectric film having pyroelectricity such as PVDF, it is not necessary to provide a complex mechanism through which a body temperature is not transferred.

Further, the operation input device according to the present invention preferably employs the following configuration. The operation input device has a housing in which the piezoelectric element of a flat film shape and the operation information generating unit are arranged on a substantially same plane and which includes a base portion including a flat shape and predetermined elasticity. In this operation input device, the base portion of the housing is placed in contact with a back surface of the information display device.

This configuration indicates an example of a specific shape of the operation input device. According to this configuration, the operation input device and the information display device have different housings. Consequently, the operation input device can be attached to the information display device later.

Further, the piezoelectric element of the operation input device according to the present invention is preferably embedded inside the base portion or applied to an inner wall surface of the base portion.

This configuration indicates an example of a specific arrangement of the piezoelectric element of the operation input device in the housing. Thus, by embedding the piezoelectric element in the housing, it is possible to protect the piezoelectric element from external environment. In this regard, by optionally setting elasticity of the base portion, the piezoelectric film is also displaced in response to displacement of the base portion of the housing caused by a press from an outside.

Hence, a decrease in detection sensitivity for a position or a pressing force caused by embedding the piezoelectric element in the base portion hardly occurs.

Further, the housing of the operation input device according to the present invention preferably employs the following configuration. The housing includes a side portion which is orthogonal to the base portion and is formed along an outer periphery of the base portion. The housing adopts a structure in which the base portion and the side portion sandwich the information display device.

According to this configuration, the operation input device can be easily fixed to the back surface side of the information display device.

Further, the piezoelectric element of the operation input device according to the present invention is preferably arranged at a position spaced a predetermined distance apart from the side portion.

According to this configuration, a vicinity of the side portion at which the amount of displacement caused by pressing the base portion is little is not included in a detection range of the position and the pressing force. Consequently, it is possible to reliably detect a position and a pressing force.

Further, in the operation input device according to the present invention, the base portion preferably includes higher elasticity in a nearly center region in a region in which the piezoelectric element is arranged than elasticity of a region other than the center region.

According to this configuration, it is possible to optionally regulate displacement of the center region which is far from the side portion and which is greatly displaced by the pressing force, and make the displacement nearly equal to displacement caused by a pressing force against a region other than the center region. Consequently, it is possible to reduce a difference between displacement amounts of pressing positions of the piezoelectric element.

Further, in the operation input device according to the present invention, the base portion preferably includes a groove formed to extend along the piezoelectric element.

According to this configuration, the base portion has the groove and therefore the base portion is likely to be displaced. Consequently, it is possible to detect a position and a pressing force from a softer press.

Further, in the operation input device according to the present invention, the piezoelectric element may be built in the back surface side of the information display device and may be integrally formed with the information display device.

According to this configuration, the operation input device is integrally formed with the information display device. Consequently, it is possible to simplify a shape as a whole.

Further, in the operation input device according to the present invention, the number of piezoelectric elements may be plural.

According to this configuration, it is possible to use operation input information of a plurality of piezoelectric elements, and to input various operations.

Further, the information display device according to the present invention relates to the information display device to which the above operation input device is connected, and has the following features. The information display device has a display control unit which displays on the display unit a mark indicating an operation position based on the operation input information.

According to this configuration, it is possible to check through the display screen on the surface a state where an operation is inputted using the piezoelectric element on the back surface side. Consequently, it is possible to easily check an operation state (where the user puts the finger) which the user cannot directly see.

Further, in the information display device according to the present invention, the display control unit preferably changes a display mode of the mark based on a change in the operation input information.

According to this configuration, it is possible to easily check the change in the operation state through the display screen.

Further, in the information display device according to the present invention, the display control unit changes the display mode of the mark based on a change in position detection information of the operation input information.

Furthermore, in the information display device according to the present invention, the display control unit changes the display mode of the mark based on a change in pressing force detection information of the operation input information.

These configurations indicate that a position and a pressing force are used as a specific example of operation input information.

It is possible to reduce stains on a display screen of an information display device even when a user inputs an operation holding the information display device by the hand, and to input the operation similar to a conventional information display device which receives an input of an operation through a surface.

DETAILED DESCRIPTION OF THE PREFERRED EMBODIMENTS

Figure 1:
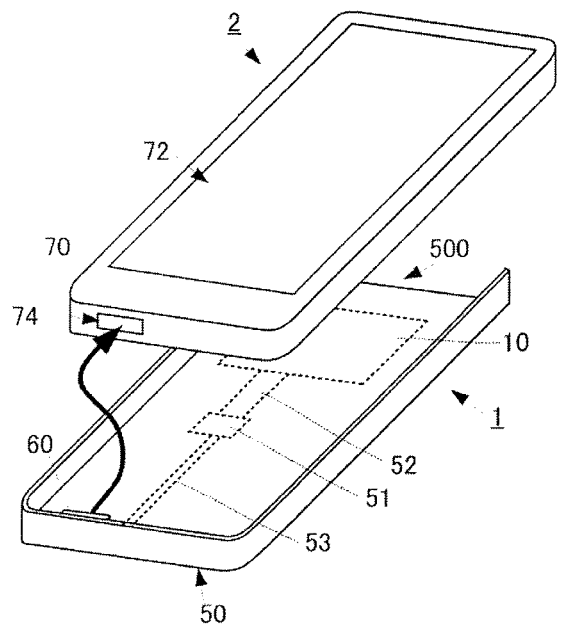
FIG. 1 is a perspective view illustrating a state where an operation input device according to a first embodiment of the present invention and an information display device are separated.

An operation input device according to the first embodiment of the present invention will be described with reference to the drawings. FIG. 1 is a perspective view illustrating a state where the operation input device according to the first embodiment of the present invention and an information display device are separated.

Figure 2:
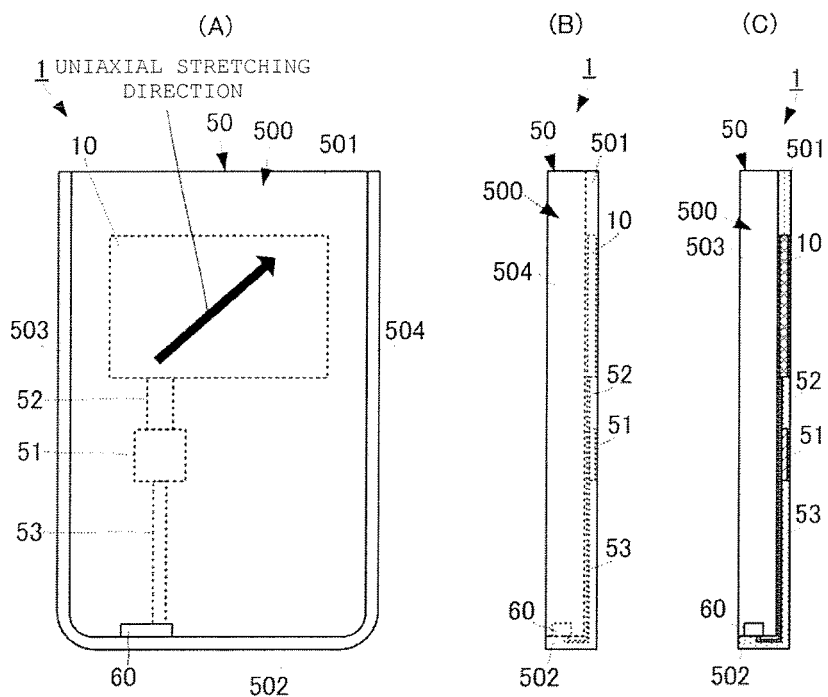
FIGS. 2(A)-(C) is a two-view and a cross-sectional view of the operation input device according to the first embodiment of the present invention.
Figure 3:
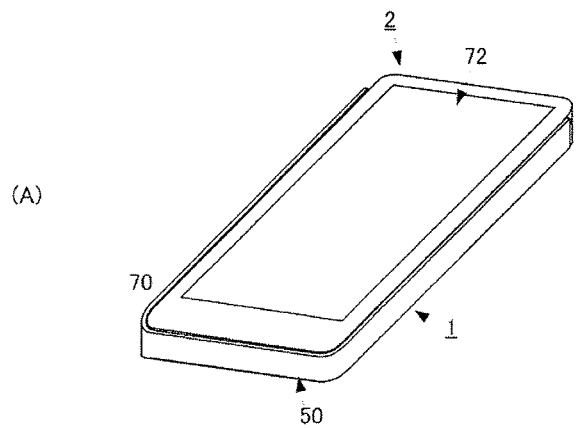
FIGS. 3(A)-(B) is a perspective view illustrating a state where the operation input device according to the first embodiment of the present invention is attached to the information display device.
Figure 3:
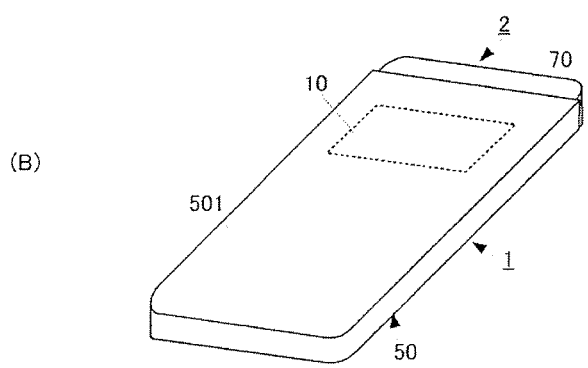

As illustrated in FIGS. 1, 2 and 3, an operation input device 1 according to the present embodiment is attached to a portable information display device 2 such as a smartphone. The information display device 2 to which the operation input device 1 is attached has a device body 70 of a nearly cuboid shape.

A display screen formed by a thin display device such as a liquid crystal display or an organic EL display is embedded in a surface of the device body 70 of the information display device 2. In addition, a touch panel may be provided on the top surface side of the display screen but is not a requisite, and may not be provided. The device body 70 of the information display device 2 has a pair of longitudinal side surfaces and a pair of lateral side surfaces orthogonal to the longitudinal side surfaces. An interface port 74 which makes connection with an external electronic part is formed in one of these lateral side surfaces.

As illustrated in FIG. 2, the operation input device 1 has a shape which covers both of the longitudinal side surfaces and one of the lateral side surfaces from the back surface of the information display device 2. FIG. 2(A) is a front view of the operation input device according to the first embodiment of the present invention. FIG. 2(B) is a side view of the operation input device. FIG. 2(C) is a cross-sectional view of the operation input device.

The operation input device 1 has a housing 50, a piezoelectric element 10 of a flat film shape, a control IC 51, connector cables 52 and 53 and an interface member 60.

The housing 50 is made of a general hard organic material such as ABS or PC, or an elastomer such as urethane and silicon having predetermined elasticity. The housing 50 has a base portion 501, and a lateral side portion 502 and longitudinal side portions 503 and 504 corresponding to side portions of the present invention, respectively. When an elastomer is selected for a material, the side portions may be formed to cover the entire side surfaces of the information display device 2.

As illustrated in FIG. 2(A), the base portion 501 has a nearly rectangular shape seen from a front view (plan view). A lateral direction length of the base portion 501 is a sidewall longer than a width of the information display device 2 (which is a horizontal length and a lateral direction length). The longitudinal direction length of the base portion 501 is optionally set according to the length of the information display device 2 (which is a vertical length and a longitudinal direction length). In case of the present embodiment, the information display device 2 has a shape which covers only one of the lateral side surfaces.

Therefore, the longitudinal direction length of the base portion 501 is a predetermined length shorter than the length of the information display device 2.

At one longitudinal direction end of the base portion 501, the lateral side portion 502 which has a shape extending along the lateral direction is formed. The height of the lateral side portion 502 (a length in the direction orthogonal to the base portion 501) is about the same as the thickness of the information display device 2.

At both lateral direction ends of the base portion 501, the longitudinal side portions 503 and 504 which have shapes extending along the longitudinal direction are formed. The heights of the longitudinal side portions 503 and 504 (the lengths in a direction orthogonal to the base portion 501) are about the same as the thickness of the information display device 2.

The height of the lateral side portion 502 is the same as the heights of the longitudinal side portions 503 and 504. The lateral side portion 502 and the longitudinal side portions 503 and 504 are formed in a shape which continues along the outer periphery of the base portion 501.

This shape provides a concave portion 500 surrounded by the base portion 501, the lateral side portion 502 and the longitudinal side portions 503 and 504 to the housing 50.

The information display device 2 is attached to the housing 50 of the operation input device 1 having a shape such that a back surface of the information display device 2 contacts the concave portion 500 side surface of the base portion 501. FIG. 3 is a perspective view illustrating a state where the operation input device according to the first embodiment of the present invention is attached to the information display device. FIG. 3(A) is a perspective view seen from the top surface side. FIG. 3(B) is a perspective view seen from the back surface side. As illustrated in FIG. 3, the information display device 1 is fixed to the housing 50 by being sandwiched by the base portion 501, the lateral side portion 502 and the longitudinal side portions 503 and 504 from the four directions. When the housing 50 is made of hard organic resin, a gap of about 0.5 to 1 mm is formed in a rear surface of the display device 2 and an inner surface of the base portion 501 of the housing 50 in a state where the housing 50 is attached to the display device 2. The base portion 501 can be deformed by this gap toward the display device 2 side by a pressing force applied to the base portion 501 from an outside. Alternatively, the above gap may be provided only at a given portion of the piezoelectric element 10. It is possible to adopt, for example, a structure in which a predetermined number of embosses are provided around the piezoelectric element 10, and these embosses contact the rear surface of the display device 2 and forcibly float the base portion 501 which is the given portion of the piezoelectric element 10 from the rear surface of the display device 2.

Although a specific configuration will be described below, the piezoelectric element 10 is formed in a flat film shape and is attached in the base portion 501 of the housing 50 such that the flat film surface is parallel to a primary surface of the base portion 501 as illustrated in FIGS. 1 and 2. The piezoelectric element 10 is attached at a predetermined position near an end portion of the base portion 501 opposite to the lateral side portion 502.

Figure 4:
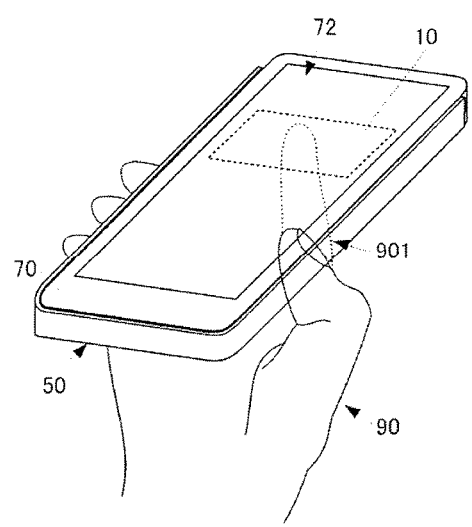
FIG. 4 is a perspective view illustrating a use mode of the information display device to which the operation input device according to the present invention is attached.

FIG. 4 is a perspective view illustrating a use mode of the information display device to which the operation input device according to the present invention is attached.

Thus, the piezoelectric element 10 is attached to the base portion 501 of the housing 50 such that, in a state where a user holds the information display device 2 to which the operation input device 1 is attached grabbing both width direction ends by one hand, a detection range of a pressing position and a pressing force of the piezoelectric element 10 overlaps a range which the forefinger or the middle finger reaches. In addition, an example where the piezoelectric element 10 is embedded and attached inside the base portion 501 has been described with the present embodiment. The piezoelectric element 10 may be arranged on an outer surface of the base portion 501 or the information display device 1 side surface. Any mode can make it possible to reliably detect a pressing position and a pressing force as long as the housing 50 has flexibility using the piezoelectric element 10 described below.

The control IC 51 and the connector cable 52 are attached inside the base portion 501 similar to the piezoelectric element 10. The piezoelectric element 10 and the control IC 51 are connected through the connector cable 52. This structure transmits various detection signals outputted from the piezoelectric element 10 to the control IC 51.

The interface member 60 is attached to the concave portion 500 side surface of the lateral side portion 502. The connector cable 53 is attached from the base portion 501 to the lateral side portion 502. The control IC 51 and the interface member 60 are connected through the connector cable 53. This structure allows operation information outputted from the control IC 51 to the interface member 60. The interface member 60 is connected to the interface port 74 of the information display device 2 in a state where the information display device 2 is attached to the operation input device 1. Thus, the operation information outputted from the control IC 51 is transmitted to the information display device 2. The information display device 2 executes various types of control processing described below based on this operation information.

Figure 5:
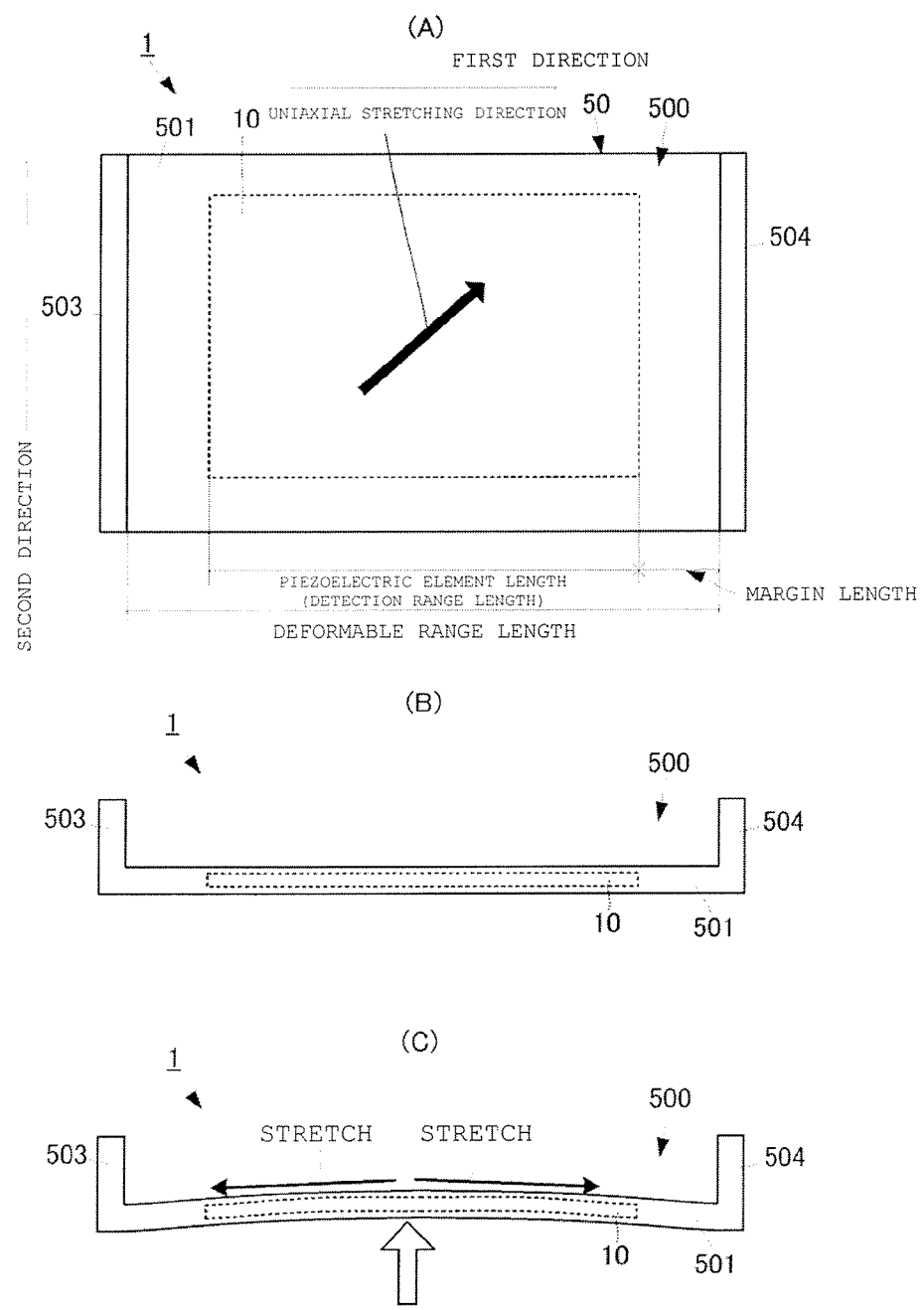
FIGS. 5(A)-(C) is a view illustrating an arrangement mode of a piezoelectric element 10 in the operation input device according to the first embodiment of the present invention and a stretched state where a press is applied from an outside.

Hereinafter, a more specific arrangement mode of the piezoelectric element 10 in the housing 50 will be described with reference to FIG. 5. FIG. 5 is an enlarged plan view illustrating an arrangement mode of the piezoelectric element 10 in the operation input device according to the first embodiment of the present invention. FIG. 5(B) is a side view of an arrangement range of the piezoelectric element 10. FIG. 5(C) is a side view of the arrangement range of the piezoelectric element 10 illustrating a stretched state in a state where a press is applied from an outside.

As illustrated in FIG. 5, the piezoelectric element 10 of the flat film shape is attached to the base portion 501 of the housing 50 such that the first direction of the rectangle matches a direction connecting the longitudinal side portions 503 and 504 of the housing 50 and the second direction matches a direction in which the longitudinal side portions 503 and 504 extend. By using this attachment configuration, the longitudinal side portions 503 and 504 are arranged at both first direction ends of a piezoelectric film 100. When the back surface of the base portion 501 is pressed as illustrated in FIG. 5(C), the longitudinal side portions 503 and 504 have shapes which extend in a direction orthogonal to the base portion 501. Therefore, the both ends of the base portion 501 connected to the longitudinal side portions 503 and 504 are hardly displaced by the press. Consequently, the structure includes the both first direction ends of the piezoelectric film 100 supported by the longitudinal side portions 503 and 504. Thus, when the base portion 501 is pressed, the base portion 501 and the piezoelectric element 10 (piezoelectric film 100) attached to the base portion 501 stretch along the first direction as illustrated in FIG. 5(C). Charges corresponding to the pressing amount are generated in the piezoelectric element 10 as a result of this stretch. Consequently, it is possible to detect the pressing amount by detecting the voltage generated by the charges.

In this regard, the piezoelectric element 10 of the flat film shape is arranged in a center region of the base portion 501 spaced a margin length of a predetermined distance apart from the longitudinal side portions 503 and 504 along the width direction of the base portion 501. Thus, by arranging the piezoelectric element 10 spaced the margin length apart from the longitudinal side portions 503 and 504, vicinities of the longitudinal side portions 503 and 504 which are hardly displaced (stretched) by the press against the back surface side of the base portion 501 are not included in a detection range, and a region which is likely to be displaced (stretched) by the press can be included in a detection range. Consequently, it is possible to improve detection sensitivity. Further, it is also possible to reduce a difference between displacement amounts in the detection range. In addition, this margin length is a design matter, and can be optionally set according to an allowable range of the difference between detection sensitivity and displacement amounts of operation information generated by the control IC 51.

Next, a specific structure of the piezoelectric element 10 will be described with reference to FIG. 6.

Figure 6:
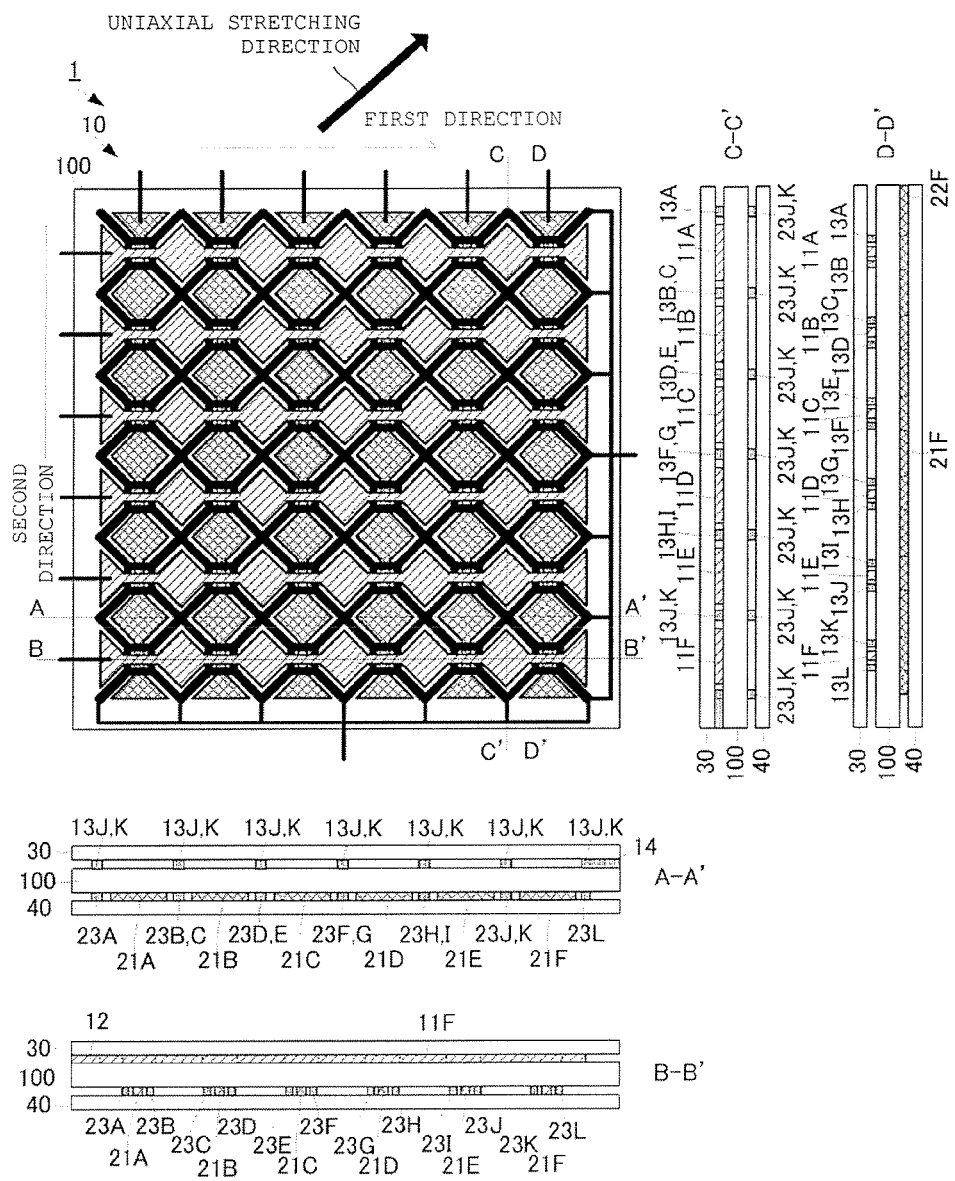
FIG. 6 is a plan view of the piezoelectric element 10 according to the first embodiment of the present invention, and is an A-A' cross-sectional view, a B-B' cross-sectional view, a C-C' cross-sectional view and a D-D' cross-sectional view.

FIG. 6 is a plan view of the piezoelectric element 10 according to the first embodiment of the present invention, and is an A-A' cross-sectional view, a B-B' cross-sectional view, a C-C' cross-sectional view and a D-D' cross-sectional view of the plan view. In addition, an electrode pattern in FIG. 6 is an example. The numbers of disposed first wire electrodes, second wire electrodes, third wire electrodes and fourth wire electrodes are not limited to these, and are optionally determined according to a specification of a touch panel.

The piezoelectric element 10 has the piezoelectric film 100, protective layers 30 and 40, and piezoelectric detection electrodes and capacitance detection electrodes formed according to a pattern described below.

The piezoelectric film 100 is a flat film of a rectangular shape having a first primary surface 100ST and a second primary surface 100SB opposing to each other. The piezoelectric film 100 is made of poly-L-lactic acid stretched (uniaxially stretched) in at least one direction. In addition, in FIG. 6, the piezoelectric film 100 has the same length in the first direction and the second direction. However, as illustrated in, for example, above FIGS. 1, 2 and 5, the first direction length and the second direction length may be different.

PLLA is chiral polymer, and the main chain adopts a spiral structure. PLLA has piezoelectricity when PLLA is uniaxially stretched and molecules are aligned. A piezoelectric constant of uniaxially stretched PLLA is very high among polymers.

In addition, a draw ratio is preferably about three to eight times. Applying thermal processing after stretching encourages crystallization of ultimate elongation chain crystal of polylactic acid and increases a piezoelectric constant.

In addition, by varying draw ratios of respective axes in case of biaxial stretching, it is possible to provide the same effect as that of uniaxial stretching. When, for example, stretching is performed eight times in a given direction as the X axis direction and two times in the Y axis direction orthogonal to the X axis direction, it is possible to provide the same effect of a piezoelectric constant as that in case where uniaxial stretching is performed four times in the X axis direction. A film which is simply uniaxially stretched is easily split in a stretching axis direction. Consequently, it is possible to increase the strength to some degree by performing biaxial stretching as described above.

Further, PLLA has piezoelectricity when molecules are aligned by way of stretching, and does not need to be subjected to polling processing unlike other polymers such as PVDF or piezoelectric ceramics. That is, the piezoelectricity of PLLA which does not belong to a ferroelectric is not expressed by polarizing ions such as a ferroelectric such as PVDF or PZT, and derives from a spiral structure which is characteristics structure of molecules. Therefore, PLLA does not have pyroelectricity produced in another ferroelectric piezoelectric body. Further, PVDF or the like has a temporal fluctuation of a piezoelectric constant, and the piezoelectric constant significantly lowers in some cases. However, the piezoelectric constant of PLLA is temporally very stable.

Further, PLLA takes about 2.5 which is a very low relative permittivity and, when d is a piezoelectric constant and $\in T$ is a dielectric constant, a piezoelectric output constant (=piezoelectric g constant and $g=d/\in T$) takes a high value. Hence, it is possible to sufficiently provide the same detection sensitivity of a pressing amount as that of PVDF by using PLLA having a piezoelectric constant $d_{14}=10$ pC/N.

PLLA has been described as an example.

However, a piezoelectric organic material having pyroelectricity such as PVDF or polyurea can also be used as the piezoelectric film 100 by using a circuit which compensates for pyroelectricity in combination. Similarly, inorganic piezoelectric material such as PZT, ZnO and AlN may also be formed in a thin film and used.

On the first primary surface 100ST of the piezoelectric film 100 made of PLLA having such characteristics, a plurality of first wire electrodes 11A, 11B, 11C, 11D, 11E and 11F which is a capacitance detection electrode, and third wire electrodes 13A, 13B, 13C, 13D, 13E, 13F, 13G, 13H, 13I, 13J, 13K and 13L which are pressing force detection electrodes are formed according to patterns illustrated in FIGS. 1 and 2. One of organic electrodes whose main components are ITO, ZnO and polythiophene and organic electrodes whose main components are polyaniline is preferably used for a plurality of these first wire electrodes 11A to 11F and the wire electrodes 13A to 13L.

Further, electrodes formed by silver pastes or metal electrodes formed by deposition, spattering or plating can also be used.

A plurality of first wire electrodes 11A to 11F has the same shape. More specifically, for example, the first wire electrode 11A has a plurality of broad portions 111, a plurality of narrow portions 112 and a pair of broad portions of end portions 113. Each broad portion 111 has a square shape. The narrow portion 112 has a rectangular shape whose length is long compared to the width. The broad portion of the end portion 113 has a nearly isosceles triangle shape. A plurality of broad portions 111 and a plurality of narrow portions 112 are connected to alternatively align along the direction in which the first wire electrode 11A extends. In this regard, each broad portion 111 is connected to the narrow portions 112 such that a diagonal line of the square and a connection direction with respect to the narrow portions 112 are parallel. Further, each broad portion 111 is connected to the narrow portion 112 at a pair of apex angles forming the diagonal line.

At both ends of the direction in which the first wire electrode 11A extends, the broad portions of the end portions 113 are provided. Both ends of continuous electrode patterns including a plurality of broad portions 111 and a plurality of narrow portions 112 are connected to the broad portions of the end portions 113 through the narrow portion 112. In this regard, the broad portions of the end portions 113 are connected to the narrow portions 112 at the apex angle of the isosceles triangle shape.

A plurality of first wire electrodes 11A to 11F is formed to extend along the first direction in the first primary surface 100ST of the piezoelectric film 100. A plurality of first wire electrodes 11A to 11F is formed at predetermined intervals along the second direction orthogonal to the first direction in the first primary surface 100ST. In this regard, a plurality of first wire electrodes 11A to 11F is formed such that the respective broad portions 111 are at the same positions along the first direction, in other words, the respective broad portions 111 are aligned along the second direction.

In this regard, the first direction and the second direction are set to directions which form an angle of nearly 45° with respect to a uniaxially stretching direction 900 of the piezoelectric film 100. Nearly 45° means, for example, an angle including about 45°±10°. These angles are design matters which are optionally determined based on usage.

A plurality of third wire electrodes 13A to 13L is formed spaced apart from the first wire electrodes 11A to 11F in a shape along an outer diameter shape of the first wire electrodes 11A to 11F.

More specifically, the third wire electrode 13A is formed spaced apart from the first wire electrode 11A along the outer diameter shape of the first wire electrode 11A opposite to the first wire electrode 11B.

The third wire electrode 13B is formed spaced apart from the first wire electrode 11A along the outer diameter shape of the first wire electrode 11A on the first wire electrode 11B side. The third wire electrode 13C is formed spaced apart from the first wire electrode 11B along the outer diameter shape of the first wire electrode 11B on the first wire electrode 11A side. The third wire electrodes 13B and 13C are connected to each other near the broad portion 111 of the first wire electrode and a corner portion of the broad portion of the end portion 113.

The third wire electrode 13D is formed spaced apart from the first wire electrode 11B along the outer diameter shape of the first wire electrode 11B on the first wire electrode 11C side. The third wire electrode 13E is formed spaced apart from the first wire electrode 11C along the outer diameter shape of the first wire electrode 11C on the first wire electrode 11B side. The third wire electrodes 13D and 13E are connected to each other near the broad portion 111 of the first wire electrode and a corner portion of the broad portion of the end portion 113.

The third wire electrode 13F is formed spaced apart from the first wire electrode 11C along the outer diameter shape of the first wire electrode 11C on the first wire electrode 11D side. The third wire electrode 13G is formed spaced apart from the first wire electrode 11D along the outer diameter shape of the first wire electrode 11D on the first wire electrode 11C side. The third wire electrodes 13F and 13G are connected to each other near the broad portion 111 of the first wire electrode and a corner portion of the broad portion of the end portion 113.

The third wire electrode 13H is formed spaced apart from the first wire electrode 11D along the outer diameter shape of the first wire electrode 11D on the first wire electrode 11E side. The third wire electrode 13I is formed spaced apart from the first wire electrode 11E along the outer diameter shape of the first wire electrode 11E on the first wire electrode 11D side. The third wire electrodes 13H and 13I are connected to each other near the broad portion 111 of the first wire electrode and a corner portion of the broad portion of the end portion 113.

The third wire electrode 13J is formed spaced apart from the first wire electrode 11E along the outer diameter shape of the first wire electrode 11E on the first wire electrode 11F side. The third wire electrode 13K is formed spaced apart from the first wire electrode 11F along the outer diameter shape of the first wire electrode 11F on the first wire electrode 11E side. The third wire electrodes 13J and 13K are connected to each other near the broad portion 111 of the first wire electrode and a corner portion of the broad portion of the end portion 113.

The third wire electrode 13L is formed spaced apart from the first wire electrode 11F along the outer diameter shape of the first wire electrode 11F opposite to the first wire electrode 11E.

The third wire electrodes 13A to 13K are brought together by a lead-out electrode 14, and is connected to an external circuit. The first wire electrodes 11A to 11F are individually connected to lead-out electrodes 12A to 12F, and are connected to external circuits through the lead-out electrodes 12A to 12F. These lead-out electrodes 12A to 12F and 14 are formed on an outer side of a region in which the first wire electrodes 11A to 11F and the third wire electrodes 13A to 13K are formed. Further, the lead-out electrodes 12A to 12F are formed at one first direction end, and the lead-out electrode 14 is formed at the other first direction end.

Further, on the second primary surface 100SB of the piezoelectric film 100, a plurality of second wire electrodes 21A, 21B, 21C, 21D, 21E and 21F which is a capacitance detection electrode, and fourth wire electrodes 23A, 23B, 23C, 23D, 23E, 23F, 23G, 23H, 23I, 23J, 23K and 23L which are pressing force detection electrodes are formed according to patterns illustrated in FIGS. 1 and 3. One of organic electrodes whose main components are ITO, ZnO and polythiophene and organic electrodes whose main components are polyaniline is preferably used for a plurality of these second wire electrodes 21A to 21F and wire electrodes 23A to 23L. Further, when transparency is not required, electrodes formed by silver pastes or metal electrodes formed by deposition, spattering or plating can also be used.

A plurality of second wire electrodes 21A to 21F has the same shape. More specifically, for example, the second wire electrode 21A has a plurality of broad portions 211, a plurality of narrow portions 212 and a pair of broad portions of end portions 213. Each broad portion 211 has a square shape. The narrow portion 212 has a rectangular shape whose length is long compared to the width. The broad portion of the end portion 213 has a nearly isosceles triangle shape. A plurality of broad portions 211 and a plurality of narrow portions 212 are connected to alternatively align along the direction in which the second wire electrode 21A extends. In this regard, each broad portion 211 is connected to the narrow portions 212 such that a diagonal line of the square and a connection direction with respect to the narrow portions 212 are parallel. Further, each broad portion 211 is connected to the narrow portion 212 at a pair of apex angles forming the diagonal line.

At both ends of the direction in which the second wire electrode 21A extends, the broad portions of end portions 213 are provided. Both ends of continuous electrode patterns including a plurality of broad portions 211 and a plurality of narrow portions 212 are connected to the broad portions of end portions 213 through the narrow portion 212. In this regard, the broad portions of end portions 213 are connected to the narrow portions 212 at the apex angle of the isosceles triangle shape.

A plurality of second wire electrodes 21A to 21F is formed to extend along the second direction in the second primary surface 100SB of the piezoelectric film 100. A plurality of second wire electrodes 21A to 21F is formed at predetermined intervals along the first direction orthogonal to the second direction in the second primary surface 100SB. In this regard, a plurality of second wire electrodes 21A to 21F is formed such that the respective broad portions 211 are at the same positions along the second direction, in other words, the respective broad portions 211 are aligned along the first direction.

Further, a plurality of second wire electrodes 21A to 21F is formed such that the respective broad portions 221 do not oppose to the broad portions 111 of the first wire electrodes 11A to 11F through the piezoelectric film 100. In other words, when seen from the first primary surface 100ST side, the second wire electrodes 21A to 21F are formed such that the respective broad portions 221 forming a plurality of second wire electrodes 21A to 21F do not overlap the respective broad portions 111 forming the first wire electrodes 11A to 11F. In still other words, only portions of the narrow portions 112 and 212 of a plurality of first wire electrodes 11A to 11F and a plurality of second wire electrodes 21A to 21F oppose to each other across the piezoelectric film 100.

Further, when seen from the first primary surface 100ST side, the first wire electrodes 11A to 11F and the second wire electrodes 21A to 21F are formed such that gaps of predetermined widths are formed between the respective broad portions 221 forming a plurality of second wire electrodes 21A to 21F and the respective broad portions 111 forming the first wire electrodes 11A to 11F. Furthermore, the widths of the gaps are set such that the wire electrodes 13A to 13K formed in the first primary surface 100ST are accommodated in the gaps when seen from the first primary surface 100ST side.

A plurality of fourth wire electrodes 23A to 23L is formed spaced apart from the second wire electrodes 21A to 21F in a shape along outer diameter shapes of the second wire electrodes 21A to 21F.

More specifically, the fourth wire electrode 23A is formed spaced apart from the second wire electrode 21A along the outer diameter shape of the second wire electrode 21A opposite to the second wire electrode 21B.

The fourth wire electrode 23B is formed spaced apart from the second wire electrode 21A along the outer diameter shape of the second wire electrode 21A on the second wire electrode 21B side. The fourth wire electrode 23C is formed spaced apart from the second wire electrode 21B along the outer diameter shape of the second wire electrode 21B on the second wire electrode 21A side. The fourth wire electrodes 23B and 23C are connected to each other near the broad portion 211 of the second wire electrode and a corner portion of the broad portion of the end portion 213.

The fourth wire electrode 23D is formed spaced apart from the second wire electrode 21B along the outer diameter shape of the second wire electrode 21B on the second wire electrode 21C side. The fourth wire electrode 23E is formed spaced apart from the second wire electrode 21C along the outer diameter shape of the second wire electrode 21C on the second wire electrode 21B side. The fourth wire electrodes 23D and 23E are connected to each other near the broad portion 211 of the second wire electrode and a corner portion of the broad portion of the end portion 213.

The fourth wire electrode 23F is formed spaced apart from the second wire electrode 21C along the outer diameter shape of the second wire electrode 21C on the second wire electrode 21D side. The fourth wire electrode 23G is formed spaced apart from the second wire electrode 21D along the outer diameter shape of the second wire electrode 21D on the second wire electrode 21C side. The fourth wire electrodes 23F and 23G are connected to each other near the broad portion 211 of the second wire electrode and a corner portion of the broad portion of the end portion 213.

The fourth wire electrode 23H is formed spaced apart from the second wire electrode 21D along the outer diameter shape of the second wire electrode 21D on the second wire electrode 21E side. The fourth wire electrode 23I is formed spaced apart from the second wire electrode 21E along the outer diameter shape of the second wire electrode 21E on the second wire electrode 21D side. The fourth wire electrodes 23H and 23I are connected to each other near the broad portion 211 of the second wire electrode and a corner portion of the broad portion of the end portion 213.

The fourth wire electrode 23J is formed spaced apart from the second wire electrode 21E along the outer diameter shape of the second wire electrode 21E on the second wire electrode 21F side. The fourth wire electrode 23K is formed spaced apart from the second wire electrode 21F along the outer diameter shape of the second wire electrode 21F on the second wire electrode 21E side. The fourth wire electrodes 23J and 23K are connected to each other near the broad portion 211 of the second wire electrode and a corner portion of the broad portion of the end portion 213.

The fourth wire electrode 23L is formed spaced apart from the second wire electrode 21F along the outer diameter shape of the second wire electrode 21F opposite to the second wire electrode 21E.

Further, the fourth wire electrodes 23A to 23L formed on the second primary surface 100SB and the third wire electrodes 13A to 13K formed on the first primary surface 100ST are formed such that the third wire electrodes 13A to 13K oppose to each other across the piezoelectric film 100 in the nearly entire length of the gaps produced between the broad portions 211 and 213 and the broad portions 111 and 113 when seen from the first primary surface 100ST side.

As illustrated in, for example, FIG. 6, the fourth wire electrode 23A opposes to the third wire electrode 13A between the broad portion of the end portion 213 of the second wire electrode 21A and the broad portion of the end portion 113 of the first wire electrode 11A. Further, the fourth wire electrode 23A opposes to the third wire electrodes 13B and 13C, respectively between the broad portion 211 of the second wire electrode 21A and the broad portions of the end portions 113 of the first wire electrodes 11A and 11B.

In addition, as illustrated in FIG. 6, the other portions of the fourth wire electrode 23A likewise oppose to the third wire electrodes 13D to 13L, and the other fourth wire electrodes 23B to 23L also oppose to the third wire electrodes 13A to 13L, respectively.

The fourth wire electrodes 23A to 23K are brought up by a lead-out electrode, and are connected to external circuits. The second wire electrodes 21A to 21F are individually connected to lead-out electrodes 22A to 22F, and are connected to external circuits through the lead-out electrodes 22A to 22F. These lead-out electrodes are formed on an outer side of a region in which the second wire electrodes 21A to 21F and the fourth wire electrodes 23A to 23K are formed. Further, the lead-out electrodes 22A to 22F are formed at one second direction end, and the other lead-out electrode is formed at the other second direction end.

The piezoelectric film 100 on which the first wire electrodes 11A to 11F, the third wire electrodes 13A to 13L, the second wire electrodes 21A to 21F and the fourth wire electrodes 23A to 23L are formed forms the piezoelectric element 10.

On the first primary surface 100ST side of the piezoelectric film 100 on the piezoelectric element 10, the protective layer 30 is disposed to cover the entire electrode pattern formation region of the first wire electrodes 11A to 11F and the third wire electrodes 13A to 13L. The protective layer 30 is made of a material having the insulation property.

On the second primary surface 100SB side of the piezoelectric film 100 on the piezoelectric element 10, the protective layer 40 is disposed to cover the entire electrode pattern formation region of the second wire electrodes 21A to 21F and the fourth wire electrodes 23A to 23L. The protective layer 40 is also made of a material having the insulation property.

As described above and as illustrated in FIGS. 1, 2 and 5, the piezoelectric element 10 of the flat film shape employing this configuration is attached such that the primary plane is parallel to the primary plane of the base portion 501 and the direction connecting the longitudinal side portions 503 and 504 (the direction parallel to the lateral side portion 502) substantially matches the first direction of the piezoelectric element 10. Each lead-out electrode of the piezoelectric element 10 is connected to the control IC 51 through the connector cable 52.

Further, the piezoelectric element 10 attached to the base portion 501 of the housing 50 in this way detects a touch position and a pressing amount generated by the user as described below.

(i) Touch Position Detection

First, the touch position is detected according to the following principle. In addition, according to a configuration of the present embodiment, a touch position detection concept is used based on a so-called projection mutual capacitance system, and details of the detection concept will not be described. Hereinafter, the touch position detection concept will be schematically described below.

Drive signals are applied to the first wire electrodes 11A to 11F through the lead-out electrodes 12A to 12F. The second wire electrodes 21A to 21F are connected to a detection circuit which is not illustrated through the lead-out electrodes 22A to 22F.

When the user's finger touches a predetermined position on the primary plane of the piezoelectric element 10 of the flat film shape in this state, part of an electric field at the touch position is guided toward the finger. Thus, a current changes at the touch position compared to a case where the finger does not touch the touch position. Consequently, the detection circuit detects such a current change, so that it is possible to detect a touch of the finger.

In this regard, as described above, the first wire electrodes 11A to 11F have shapes extending toward the first direction and are disposed at predetermined intervals along the second direction, and the second wire electrodes 21A to 21F have shapes extending toward the second direction and are disposed at predetermined intervals along the first direction. Consequently, positions at which the first wire electrodes 11A to 11F and the second wire electrodes 21A to 21F oppose to each other across the piezoelectric film 100, in other words, a position at which an electric field is produced and a detection current flows can be detected from a two-dimensional coordinate according to a combination of the first wire electrode and the second wire electrode which form the opposing position. When, for example, an operator touches a vicinity of the opposing position of the first wire electrode 11C and the second wire electrode 21D, the electric field changes near the opposing position, and a current flowing from the first wire electrode 11C through the second wire electrode 21D changes. In this regard, the electric field does not change at the other opposing portions, and therefore the current does not change, either. It is possible to detect the touch position by using this principle.

(ii) Pressing Amount Detection

When the user presses the primary plane of the piezoelectric element 10 of the flat film shape by the finger, a pressing force as indicated by a bold arrow in FIG. 5(C) is applied to the piezoelectric element 10. In this case, the piezoelectric element 10 is pressed toward a direction orthogonal to the primary plane, and stretches along the first direction. This stress polarizes the piezoelectric film 100 to the first primary surface and the second primary surface.

In this regard, as described above, the third wire electrodes 13A to 13L are formed on the first primary surface and the fourth wire electrodes 23A to 23L are formed on the second primary surface. Therefore, a potential difference is produced between the third wire electrodes 13A to 13L and the fourth wire electrodes 23A to 23L. Consequently, by detecting the potential difference, i.e., a piezoelectric voltage, it is possible to detect a press of the finger, in other words, a press caused by a touch of the finger.

Further, a detection voltage (piezoelectric voltage) of PLLA linearly changes according to the pressing amount. Consequently, it is also possible to detect the pressing amount by measuring a detection voltage value. That is, it is possible to accurately detect whether the operator softly touches or strongly presses an operation screen. In addition, the detection voltage of the piezoelectric film 100 is generally produced at a moment at which a stress is produced, and a detection voltage value also lowers rapidly as leakage of charges is caused by a piezoelectric effect. However, it is possible to maintain a detection voltage value for a predetermined period of time by using a detection circuit having a high input impedance for the detection circuit of the pressing amount. Consequently, it is possible to more reliably measure a detection voltage value and detect a pressing amount.

Thus, when the above configuration is employed, it is possible to simultaneously detect a touch position and a pressing amount (pressing force) only by forming capacitance detection electrodes and pressing force detection electrodes on both opposing surfaces of one piezoelectric film 100.

Further, as described above, the piezoelectric element 10 is arranged such that the first direction of the piezoelectric film 100 and the direction connecting the longitudinal side portions 503 and 504 (the direction parallel to the lateral side portion 502) match. Consequently, an angle formed between the uniaxial stretching direction of the piezoelectric film 100 and the stretching direction caused by the press is nearly 45°. Consequently, it is possible to efficiently obtain a detection voltage.

Further, by using PLLA of the piezoelectric film 100, pyroelectricity does not cause a negative influence. Consequently, it is possible to obtain a detection voltage corresponding to the pressing amount alone without depending on a temperature of a detected position upon detection. That is, it is possible to more accurately detect the pressing amount. Further, PLLA is polymer and has flexibility and, consequently, is not damaged by significant displacement unlike piezoelectric ceramic. Consequently, it is possible to reliably detect a displacement amount even when the displacement amount is significant.

In addition, disposing the protective layers 30 and 40 has been described above. However, as described above, the protective layers 30 and 40 can be omitted when the protective layers 30 and 40 are disposed inside the base portion 501 of the housing 50 having the insulation property. Consequently, it is possible to make the thickness of the base portion 501 thinner.

Further, an example where the longitudinal side portions 503 and 504 become support columns when the piezoelectric film 100 of the piezoelectric element 10 detects the pressing amount has been described above. However, materials having higher elasticity may be inserted in the base portion 501 of the housing 50 near the both first direction end portions of the piezoelectric film 100 and used as support columns.

Next, a configuration of executing a predetermined application in the information display device 2 based on a detection signal of a touch position and a detection signal of a pressing amount detected by the piezoelectric element 10 will be described. In addition, some application examples will be described below. However, the configuration of the present invention is applicable as long as applications can be realized using a touch position and a pressing amount.

Figure 7:
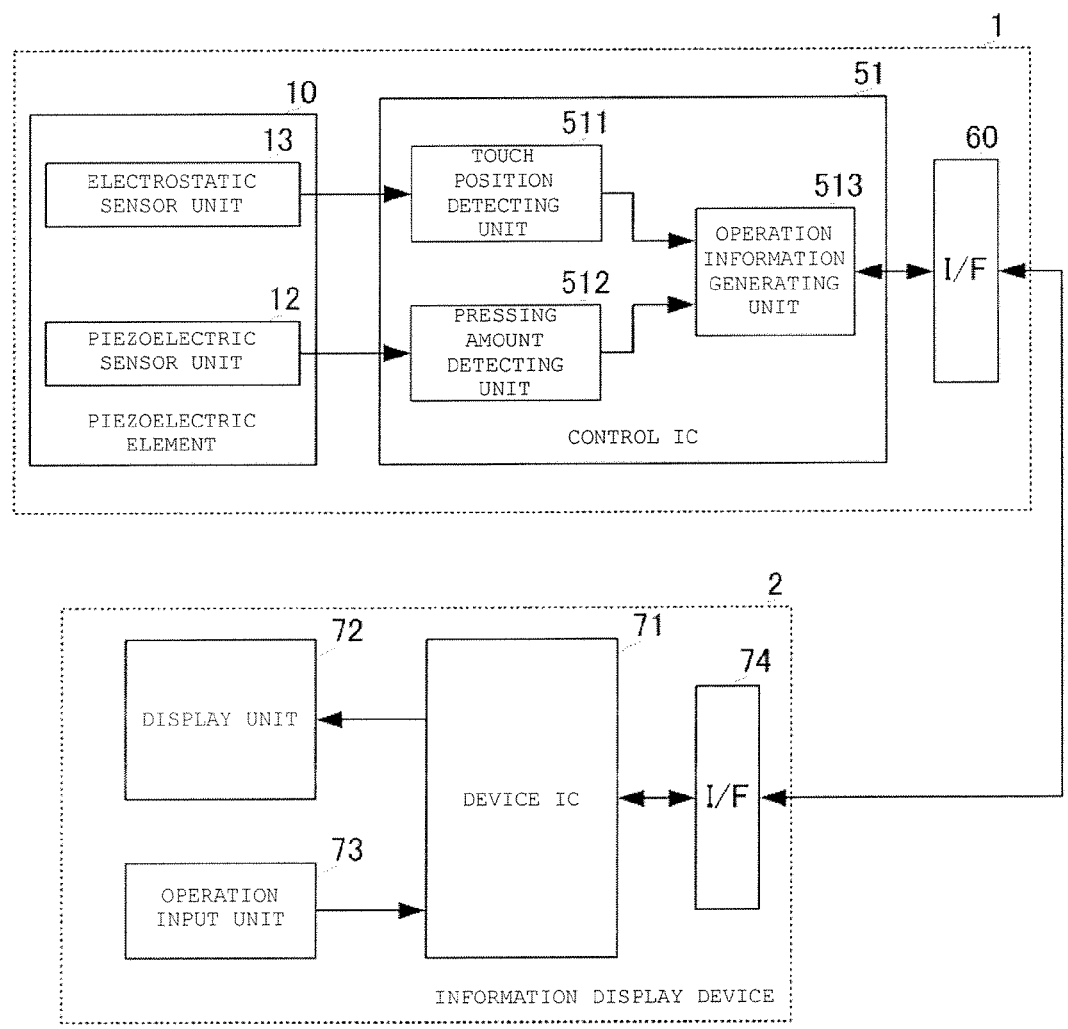
FIG. 7 is a functional block diagram of an operation input device 1 and an information display device 2 according to an embodiment of the present invention.

FIG. 7 is a functional block diagram of the operation input device 1 according to the embodiment of the present invention and the information display device 2.

The operation input device 1 has a piezoelectric sensor unit 12 which includes the pressing force detection electrodes formed on the above piezoelectric film 100, and an electrostatic sensor unit 13 which includes the capacitance detection electrodes formed on the piezoelectric film 100. The piezoelectric sensor unit 12 outputs a pressing amount detection signal corresponding to a pressing amount generated by the user's finger. The electrostatic sensor unit 13 outputs a touch position detection signal corresponding to a position touched by the user's finger.

The control IC 51 has a touch position detecting unit 511, a pressing amount detecting unit 512 and an operation information generating unit 513. The touch position detecting unit 511 detects a position touched by the user's finger based on a touch position detection signal, and outputs the touch position to the operation information generating unit 513. The pressing amount detecting unit 512 detects a pressing amount based on a pressing amount detection signal, and outputs the pressing amount to the operation information generating unit 513. The operation information generating unit 513 generates operation information including the detected position and pressing amount. The operation information generating unit 513 outputs the operation information to the information display device 2 through the interface member 60.

The information display device 2 has a device IC 71, a display unit 72, an operation input unit 73 and the interface port 74. The display unit 72 and the interface port 74 employ the above configurations. The operation input unit 73 may be a touch panel or the like arranged on the surface of the display unit 72, or a mechanical operation input element (a keypad or the like) additionally provided (and not illustrated) to the housing 70.

The device IC 71 is an information processing element which realizes a function of the information display device 2, and executes a call or transmission and reception of electronic mails and various applications when, for example, the information display device 2 is a smartphone.

Further, the device IC 71 receives an input of operation information from the operation input device 1 through the interface port 74. The device IC 71 displays an image based on the inputted operation information on the display unit 72, and updates a display image based on the inputted operation information.

Consequently, it is possible to execute various functions and applications of the information display device 2 based on operation information received by the piezoelectric element 10 of the operation input device 1 arranged on the back surface side of the information display device 2 without using the operation unit 73 of the information display device 2.

Hereinafter, some examples of various functions and applications will be described.

(A) Movement of Pointer

Figure 8:
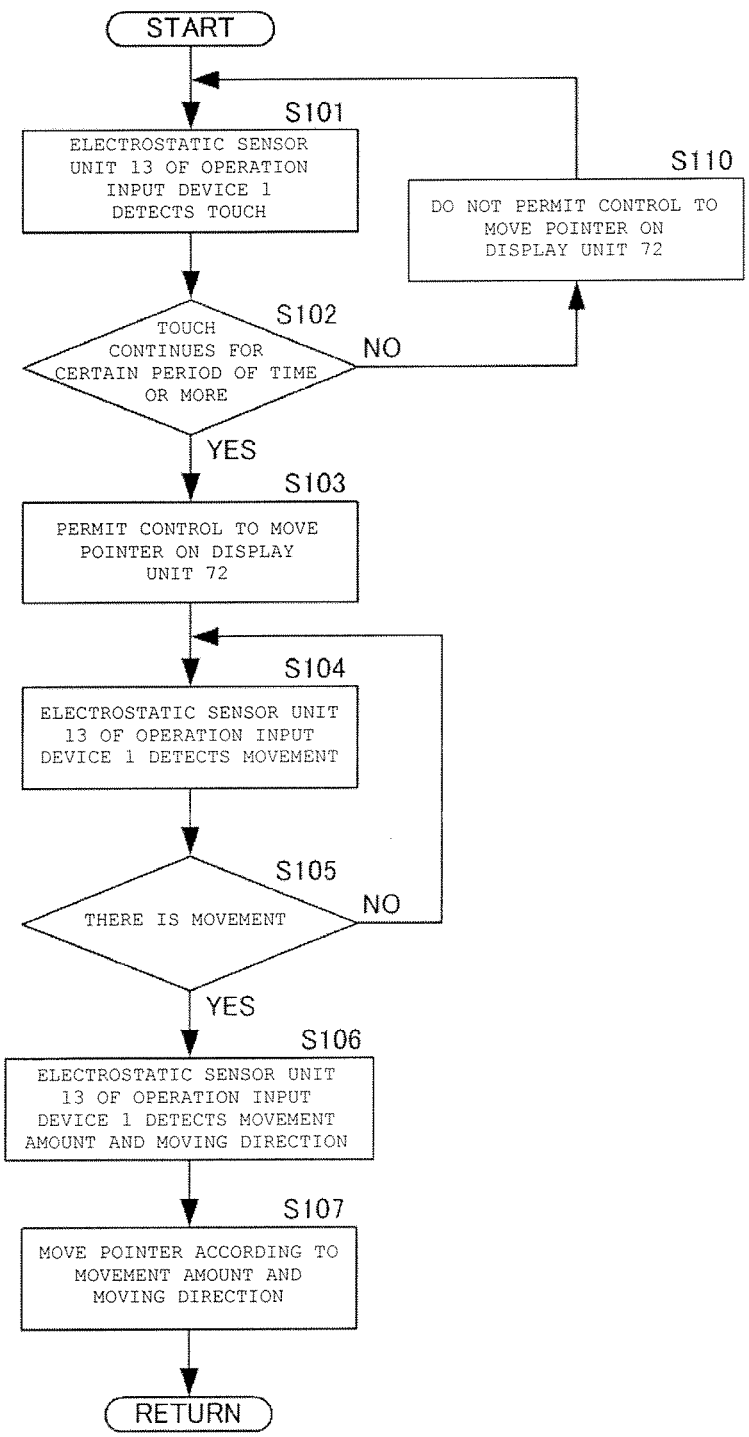
FIG. 8 is a flowchart illustrating a method of realizing a function of moving a pointer displayed on a display unit 72 of the information display device 2 by inputting an operation through the piezoelectric element 10 of the operation input device 1.
Figure 9:
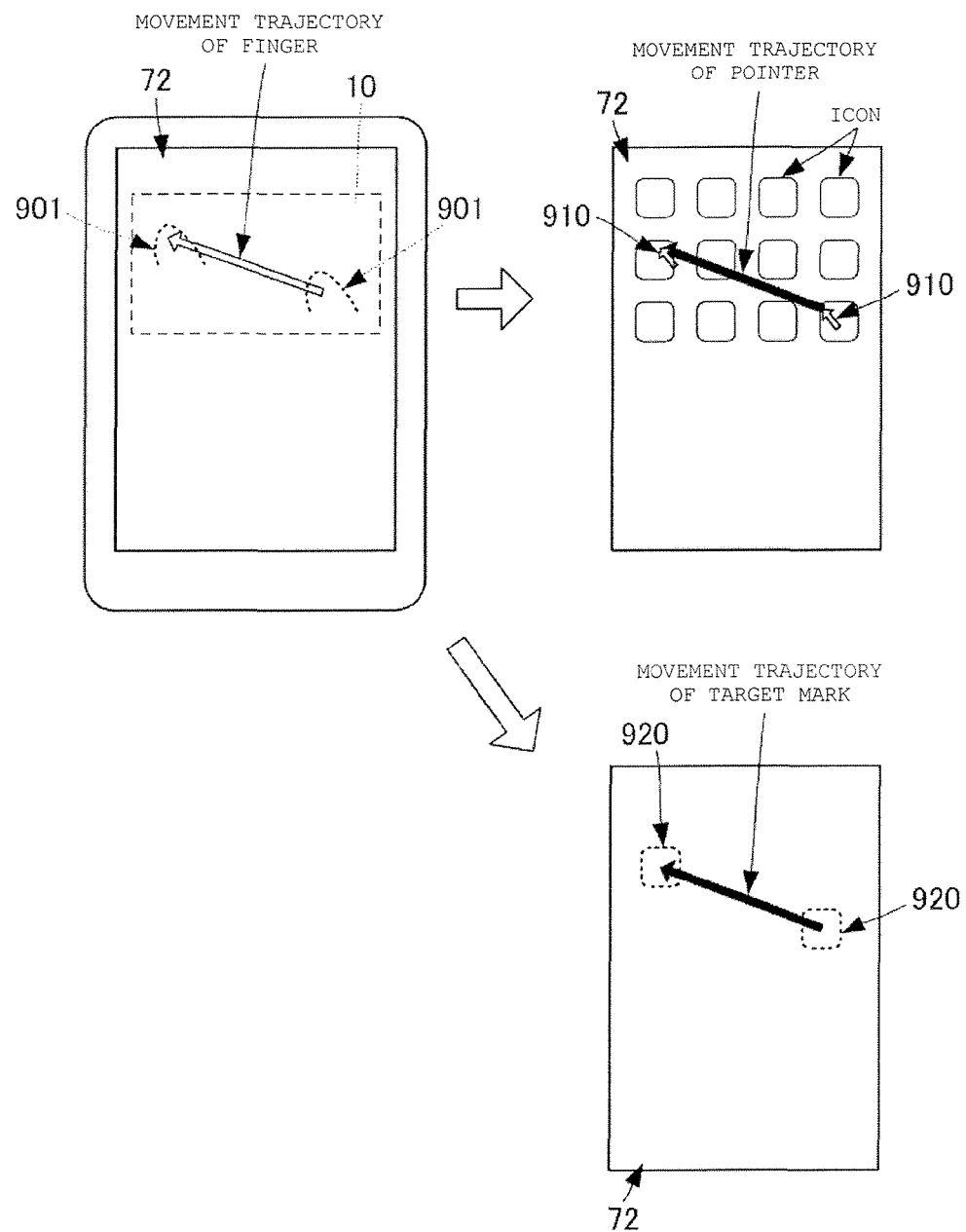
FIG. 9 is a view illustrating a top surface side of the information display device 2 for explaining a display mode of a pointer and a display mode of a target mark.

FIG. 8 is a flowchart illustrating a method of realizing a function of moving a pointer displayed on the display unit 72 of the information display device 2 by inputting an operation through the piezoelectric element 10 of the operation input device 1. FIG. 9 is a view illustrating a top surface side of the information display device 2 for explaining a display mode of a pointer and a display mode of a target mark.

First, the electrostatic sensor unit 13 of the operation input device 1 detects a touch position (S101). When the electrostatic sensor unit 13 can detect a touch of the finger for a predetermined period of time or more, i.e., the electrostatic sensor unit 13 can obtain a touch position detection signal (S102: YES), the device IC 71 permits control to move a pointer on the display unit 72 (S103). In addition, when the electrostatic sensor unit 13 cannot detect the touch of the finger for a predetermined period of time or more (S102: NO), the device IC 71 does not permit control to move the pointer on the display unit 72, and continues detecting the touch until the touch of the finger for a predetermined period of time or more is detected (S110→S101).

The device IC 71 permits control to move the pointer on the display unit 72, and then detects whether or not a touch position moves based on the operation information from the control IC 51, i.e., a touch position detection signal detected by the electrostatic sensor unit 13 (S104).

When detecting that the touch position moves (S105: YES), the device IC 71 detects a movement amount and a moving direction based on a pre-movement touch position and a post-movement touch position (S106).

The device IC 71 moves a display position of the pointer on the display unit 72 based on the detected movement amount and moving direction.

When this control is performed, by moving a finger 901 while placing the finger 901 in contact with the piezoelectric element 10 on the back surface side of the information display device 2 as illustrated in FIG. 9, it is possible to move and display a pointer 910 on a display screen of the display unit 72 on the top surface side of the information display device 2 while causing the pointer 910 to follow the movement of the finger 901.

(B) Display and Deletion of Target Mark

Figure 10:
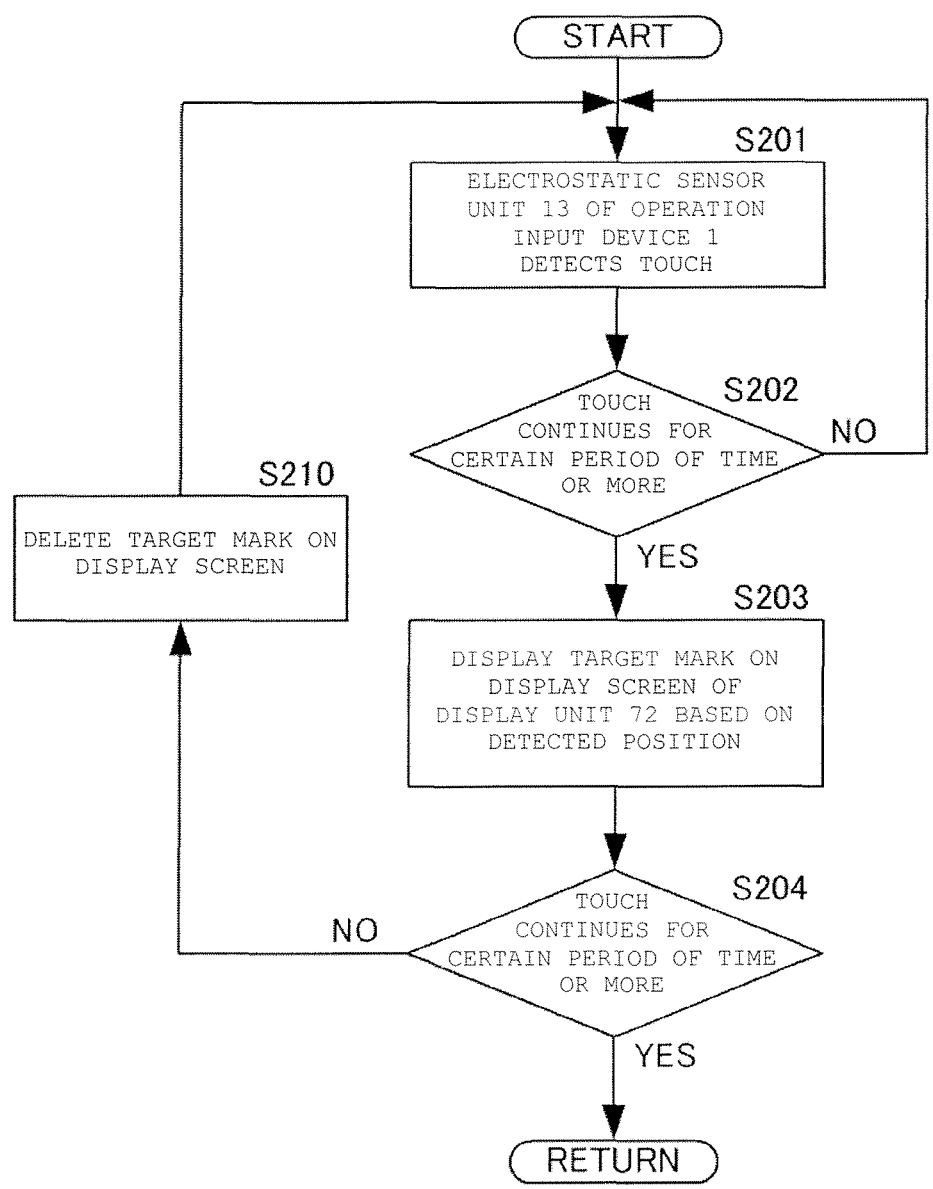
FIG. 10 is a flowchart illustrating a method of displaying and deleting a target mark corresponding to an operation of a user's finger.

FIG. 10 is a flowchart illustrating a method of displaying and deleting a target mark corresponding to an operation of a user's finger.

First, the electrostatic sensor unit 13 of the operation input device 1 detects a touch position (S201). When the electrostatic sensor unit 13 can detect a touch of the finger for a predetermined period of time or more, i.e., the electrostatic sensor unit 13 can obtain a touch position detection signal (S202: YES), the device IC 71 displays a target mark matching a touch position (see a target mark 920 in FIG. 9) on the display screen of the display unit 72 (S203). Consequently, the user can visually check an operation position of the user's finger 901 on the display screen and accurately learn the user's operation even if the piezoelectric element 10 is provided on the back surface side of the information display device 2 which cannot be directly viewed.

In addition, when the electrostatic sensor unit 13 cannot detect the touch of the finger for a predetermined period of time or more (S202: NO), the device IC 71 does not display the target mark on the display screen of the display unit 72, and continues detecting the touch until the touch of the finger for a predetermined period of time or more is detected (S202: NO→S201).

When displaying the target mark on the display screen of the display unit 72 and then detecting that there is no touch for a predetermined period of time or more from the control IC 51 (S204: NO), the device IC 71 deletes the target mark on the display screen of the display unit 72. That is, when the user moves the finger 901 away from the surface of the piezoelectric element 10, the target mark is deleted from the display screen after a predetermined period of time passes.

In addition, when displaying the target mark on the display screen of the display unit 72 and then detecting that a touch continues for a predetermined period of time or more from the control IC 51 (S204: YES), the device IC 71 keeps displaying the target mark on the display screen.

(C) Movement of Target Mark

Figure 11:
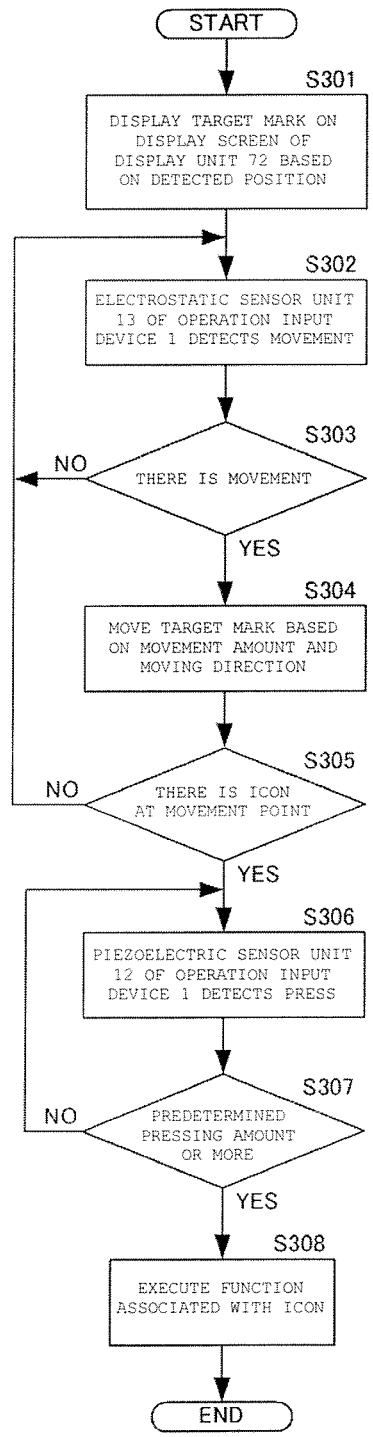
FIG. 11 is a flowchart illustrating a method of realizing a function of moving a target mark displayed on the display unit 72 of the information display device 2, and a function of executing a function associated with an icon based on the movement of the target mark.

When the user moves the position of the finger 901 while processing of displaying the target mark as described in (B) is performed, the target mark on the display screen is moved to follow the movement of this finger as described below. FIG. 11 is a flowchart illustrating a method of realizing a function of moving a target mark displayed on the display unit 72 of the information display device 2, and a function of executing a function associated with an icon based on the movement of the target mark.

First, a target mark is displayed on a display screen of the display unit 72 according to the processing described in above (B) (S301).

The device IC 71 displays the target mark on the display screen of the display unit 72, and then detects whether or not a touch position moves based on the operation information from the control IC 51, i.e., a touch position detection signal detected by the electrostatic sensor unit 13 (S302).

When detecting that the touch position moves (S303: YES), the device IC 71 detects a movement amount and a moving direction based on a pre-movement touch position and a post-movement touch position, and moves the display position of the target mark according to the movement amount and the moving direction (S304). As illustrated in, for example, FIG. 9, by moving the finger 901 while placing the finger 901 in contact with the piezoelectric element 10, the target mark 920 on the display screen is also moved and displayed following this movement.

In addition, when detecting no movement, the device IC 71 does not move the target mark and continues detecting movement (S303: NO→S302).

According to this processing, the user can accurately learn the movement of the finger 901 which the user cannot directly view, based on the movement of the target mark 920 on the display screen.

Next, the device IC 71 checks whether or not there is an icon at a position to which the target mark has moved. The position of the icon on the display screen is learned by the device IC 71.

When detecting that the target mark and the position of the icon overlap (S305: YES), the device IC 71 detects the pressing amount detected by the piezoelectric sensor unit 12 of the operation input device 1, based on the operation information of the operation information generating unit 513 (S306).

In addition, when detecting that the target mark and the position of the icon do not overlap, the device IC 71 continues detecting movement of the target mark (S305: NO→S302).

When detecting that the pressing amount is a predetermined pressing amount, the device IC 71 executes a function (application) associated with the icon (S307: YES→S308). Meanwhile, when detecting that the pressing amount does not reach the predetermined pressing amount, the device IC 71 continues detecting the pressing amount (S307: NO→S306).

By performing this processing, the user can execute a desired function and application without touching the display screen.

In addition, an example where a target mark is displayed and is moved to an icon has been described above.

However, a positional relationship with respect to an icon may be detected based on a detected touch position and, when the touch position and the icon position overlap, the icon may be highlighted. Further, when the pressing amount equal to or more than the predetermined pressing amount is detected in this highlighted state, a function and an application associated with the corresponding icon may be executed.

(D) Enlarged Display of Screen 1

Figure 12:
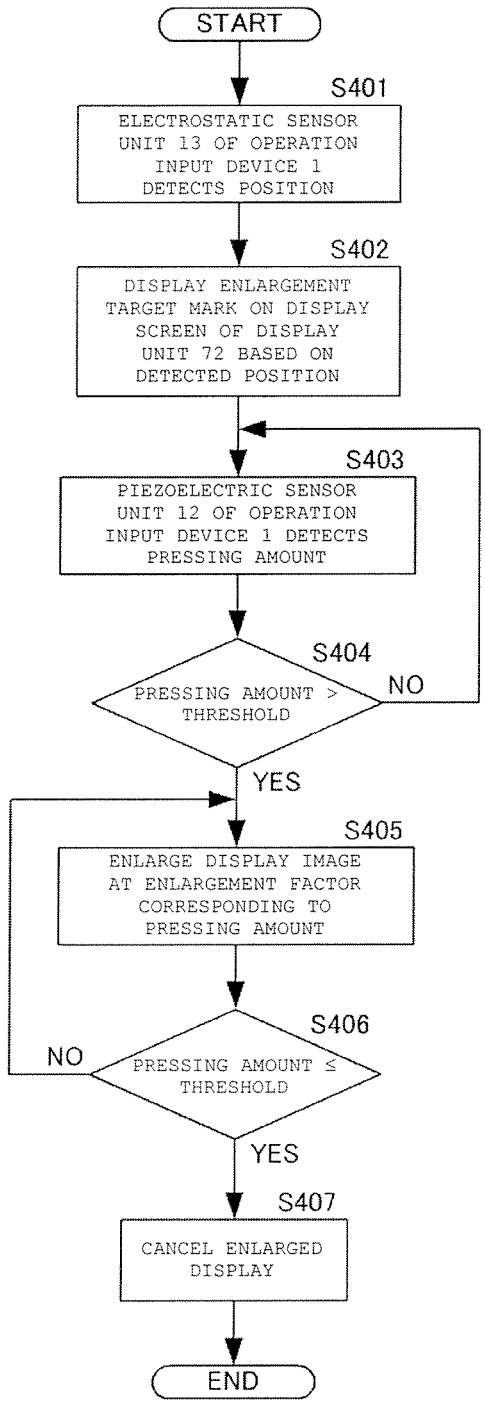
FIG. 12 is a flowchart illustrating a first method of realizing a function of enlarging and displaying a display screen of the display unit 72 of the information display device 2.

FIG. 12 is a flowchart illustrating a first method of realizing a function of enlarging and displaying the display screen of the display unit 72 of the information display device 2.

First, the electrostatic sensor unit 13 of the operation input device 1 detects a touch position (S401). The device IC 71 displays an enlargement target mark which surrounds a predetermined range around the detected touch position, on the display screen of the display unit 72 (S402).

The device IC 71 detects the pressing amount detected by the piezoelectric sensor unit 12 of the operation input device 1 from the operation information of the operation information generating unit 513 (S403).

When detecting that the pressing amount is larger than a threshold, the device IC 71 enlarges and displays a display screen at an enlargement factor corresponding to the pressing amount (S404: YES→S405). In this regard, the device IC 71 enlarges and displays the display screen such that the center of the target mark is set to the center of the enlarged region and this position is set to the center of the display screen. In addition, the display screen may be simply enlarged and displayed at the enlargement factor corresponding to the pressing amount without changing the center of the display screen.

When detecting that the pressing amount is a threshold or less, the device IC 71 continues detecting the pressing amount without enlarging and displaying the display screen (S404: NO→S403).

When detecting that the pressing amount is the threshold or less in a state where the display screen is enlarged and displayed, the device IC 71 cancels the enlarged display (S406: YES→S407). Meanwhile, while detecting that the pressing amount is larger than the threshold, the device IC 71 continues the enlarged display (S406: NO→S405).

By performing this processing, the user can enlarge and display the display screen without touching the display screen. Consequently, the user can enlarge and display the display screen while accurately checking a position which needs to be enlarged on the display screen without being bothered by the finger.

(E) Enlarged Display of Screen 2

Figure 13:
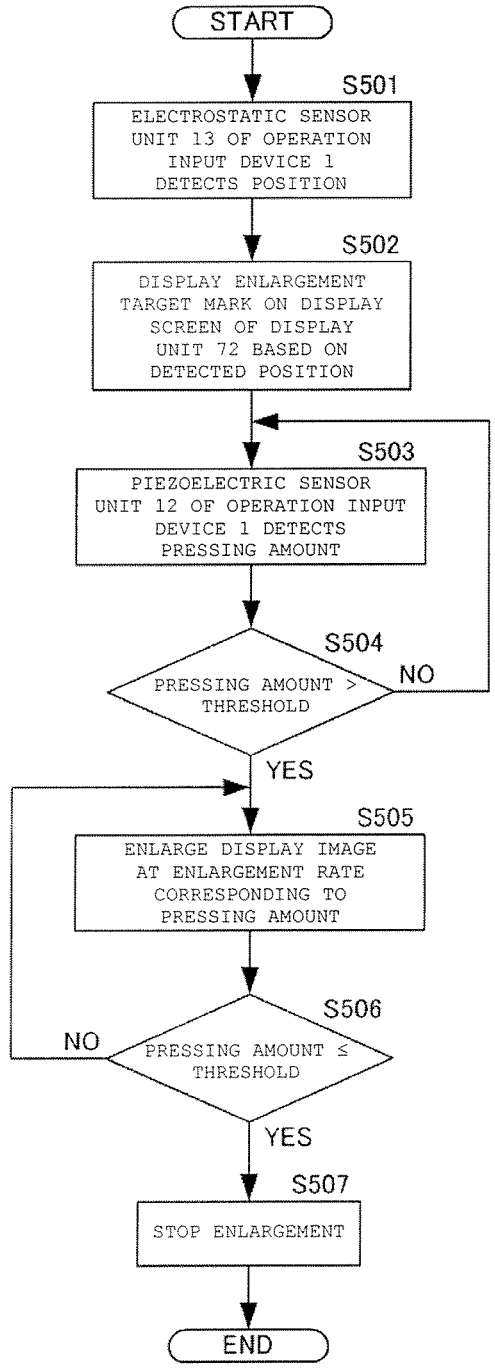
FIG. 13 is a flowchart illustrating a second method of realizing a function of enlarging and displaying the display screen of the display unit 72 of the information display device 2.
Figure 14:
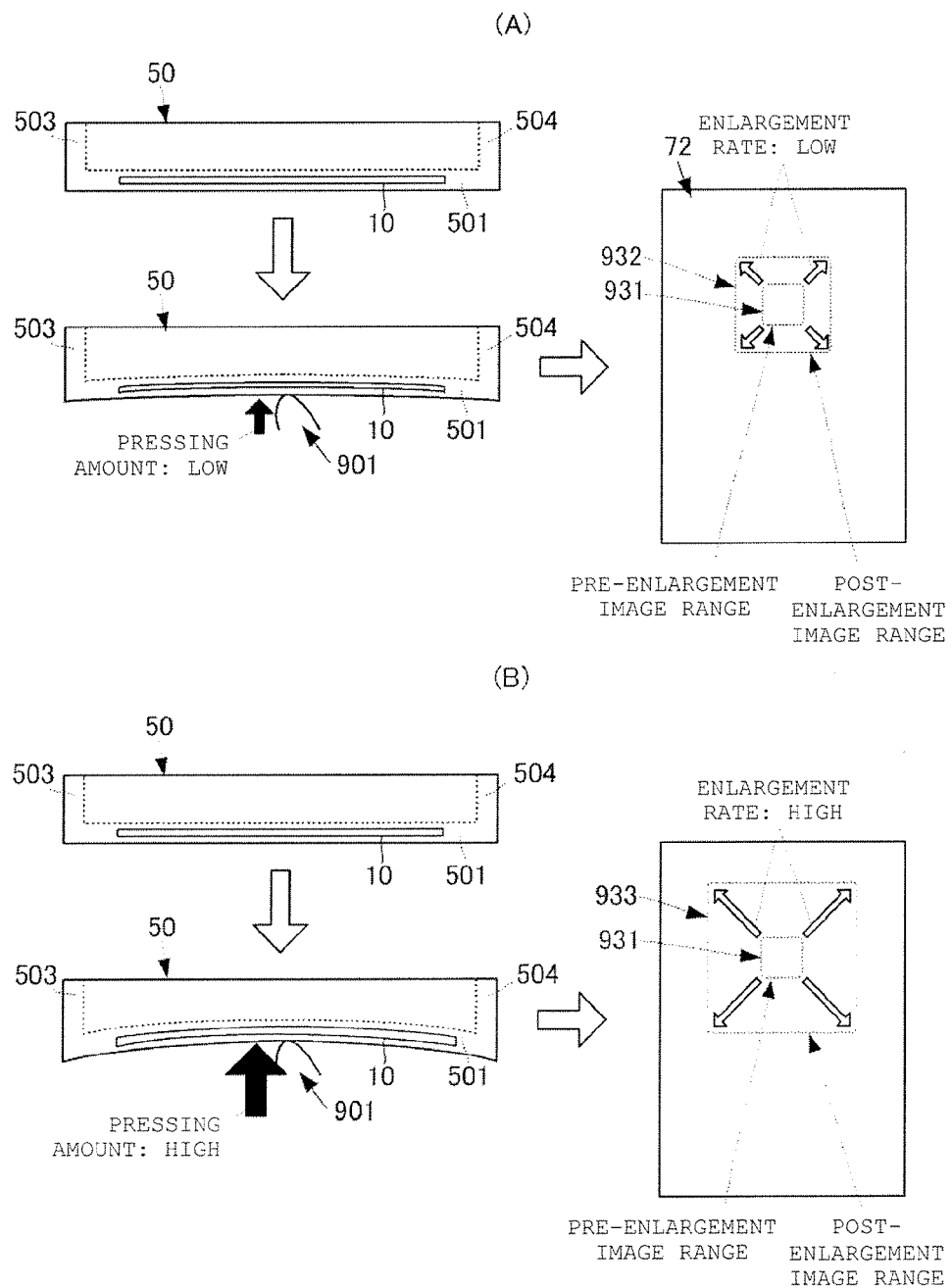
FIGS. 14(A)-(B) is a view illustrating an enlargement mode of the display screen using the second enlarging/display control method.

FIG. 13 is a flowchart illustrating a second method of realizing a function of enlarging and displaying the display screen of the display unit 72 of the information display device 2. FIG. 14 is a view illustrating an enlargement mode of the display screen using the second method, and FIG. 14(A) illustrates that the pressing amount is low and FIG. 14(B) illustrates that the pressing amount is high.

First, the electrostatic sensor unit 13 of the operation input device 1 detects a touch position (S501). The device IC 71 displays an enlargement target mark which surrounds a predetermined range around the detected touch position, on the display screen of the display unit 72 (S502).

The device IC 71 detects the pressing amount detected by the piezoelectric sensor unit 12 of the operation input device 1 from the operation information of the operation information generating unit 513 (S503).

When detecting that the pressing amount is larger than a threshold, the device IC 71 sequentially enlarges and displays the display screen at an enlargement rate corresponding to the pressing amount (S504: YES→S505). In this regard, the device IC 71 enlarges and displays the display screen such that the center of the target mark is set to the center of the enlarged region and this position is set to the center of the display screen. In addition, the display screen may be simply enlarged and displayed at the enlargement rate corresponding to the pressing amount without changing the center of the display screen.

When, for example, the pressing amount is relatively low in a range greater than the threshold, the display screen is enlarged and displayed at a low speed such that an image corresponding to an enlargement range 931 is displayed in a wider enlargement range 932 as illustrated in FIG. 14(A). Meanwhile, when the pressing amount is relatively high in a range greater than the threshold, the display screen is enlarged and displayed at a higher speed in the same time as that in FIG. 14(A) such that the image corresponding to the enlargement range 931 is displayed in a wider enlargement range 933 as illustrated in FIG. 14(B).

When detecting that the pressing amount is a threshold or less, the device IC 71 continues detecting the pressing amount without enlarging and displaying the display screen (S504: NO→S503).

When detecting that the pressing amount is the threshold or less in a state where the display screen is sequentially enlarged and displayed, the device IC 71 stops enlargement processing and continues displaying the screen at an enlargement factor at a point of time when the enlargement processing is stopped (S506: YES→S507). Meanwhile, while detecting that the pressing amount is larger than the threshold, the device IC 71 continues sequentially enlarging and displaying the display screen according to an enlargement rate (S506: NO→S505).

By performing such processing, the user can enlarge and display the display screen without touching the display screen. Consequently, the user can enlarge and display the display screen while accurately checking a position which needs to be enlarged on the display screen without being bothered by the finger.

As described above, by using the configuration and the processing according to the present embodiment, the user can execute the same function and application as those in case where a touch panel is arranged on the display screen, without touching the display screen of the information display device 2. Consequently, it is possible to prevent a decrease in operability caused when the display screen cannot be seen upon an operation, and stains on the display screen. Further, it is possible to remove the touch panel on the display screen.

In this regard, by using the above piezoelectric element 10 of the flat film shape, it is possible to make the thickness of the operation input device 1 arranged on the back surface side of the information display device 2 thinner. Consequently, it is possible to use a cover for protecting the information display device 2 as the operation input device 1. Further, by using PLLA for the piezoelectric film 100 of the piezoelectric element 10, the operation input device has high operation detection sensitivity as described above, becomes indestructible and accurately and reliably input an operation without being influenced by a temperature of a user's hand or finger.

Next, an operation input device 1A according to the second embodiment will be described with reference to the drawings. The operation input device 1A according to the present embodiment differs from an operation input device 1 according to the first embodiment in a structure of a housing 50A in an arrangement region of a piezoelectric element 10, and the other configurations are the same. FIG. 15(A) is an enlarged plan view illustrating a mode of a housing in an arrangement region of the piezoelectric element in the operation input device according to the second embodiment of the present invention.

FIG. 15(B) is a side view of an arrangement region of the piezoelectric element in the housing.

Figure 15:
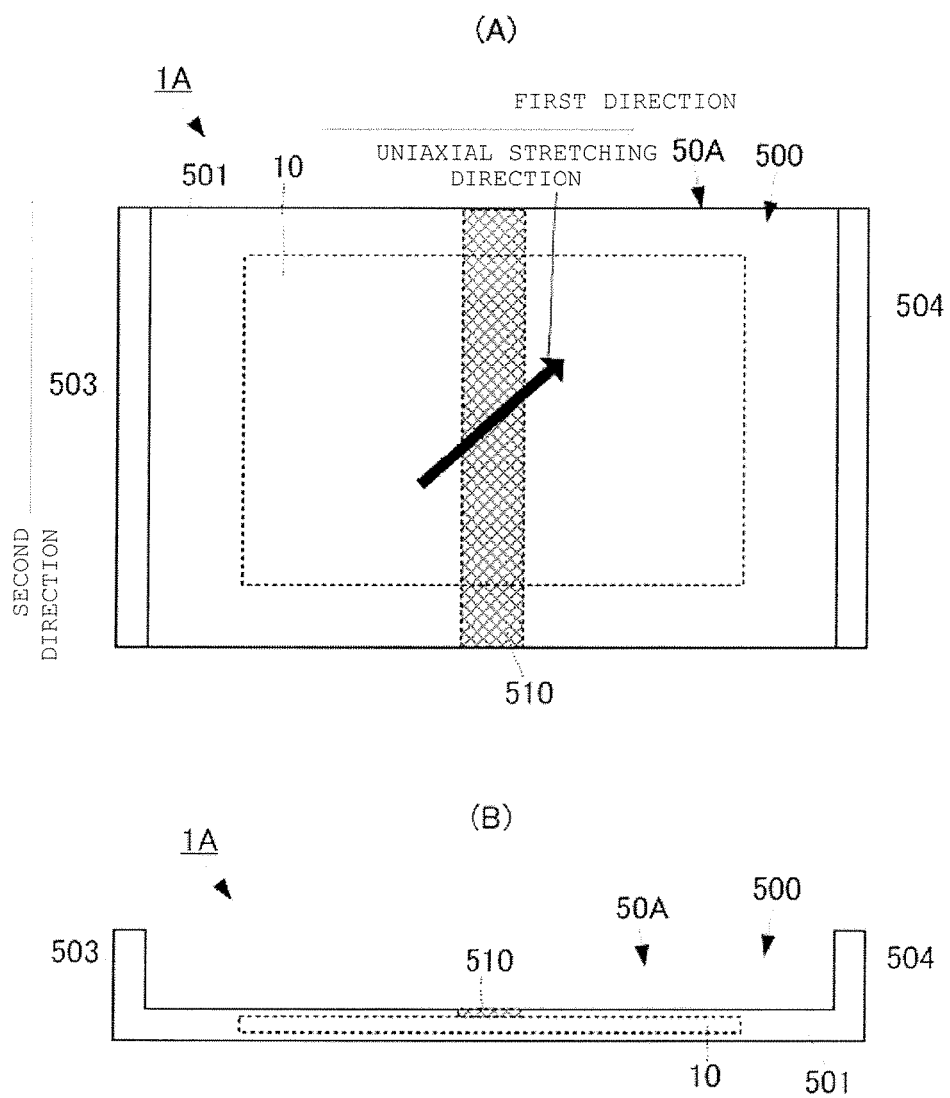
FIGS. 15(A)-(B) is an enlarged plan view and a side view illustrating a mode of a housing in an arrangement region of a piezoelectric element in the operation input device according to a second embodiment of the present invention.

As illustrated in FIG. 15, the housing 50A of the operation input device 1A according to the present embodiment has an auxiliary member 510 in a center of the first direction in a region of a base portion 501 in which the piezoelectric element 10 is arranged. The auxiliary member 510 is formed using a material having higher elasticity than that of the base portion 501. The auxiliary member 510 has a predetermined width along the first direction, and is formed into a shape which is longer than the entire length of the piezoelectric element 10 along the second direction. The width of the first direction and the length of the second direction may be optionally set based on elasticity of the base portion 501 and a material of a piezoelectric film 100.

By employing this configuration, even the same pressing amount can regulate displacement caused by a press against the first direction center region of the piezoelectric element 10 which is easily displaced. Consequently, it is possible to reduce the difference between displacement amounts of both first direction ends and the first direction center region of the piezoelectric element 10 with respect to the same pressing amount. Consequently, it is possible to suppress a difference between detection voltages depending on pressing positions and to skip or simplify compensation processing of a control IC 51 based on a position.

Further, when a housing 50 is made of a hard material, the thickness of the housing 50 may not be fixed. That is, a structure having a varying thickness of the base portion 501 may be adopted such that deformation which causes an output of the substantially same voltage as long as any portion is pressed by the same pressing force is achieved. Such a variation in the thickness is a design matter which needs to be determined by taking into account hardness of a material of use or the size of the piezoelectric element 10.

Next, an operation input device 1B according to the third embodiment of the present invention will be described with reference to the drawings. The operation input device 1B according to the present embodiment differs from an operation input device 1 according to the first embodiment in a structure of a housing 50B in an arrangement region of a piezoelectric element 10, and the other configurations are the same. FIG. 16(A) is an enlarged plan view illustrating a mode of a housing in an arrangement region of the piezoelectric element in the operation input device according to the third embodiment of the present invention.

FIG. 16(B) is a side view of an arrangement region of the piezoelectric element in the housing.

Figure 16:
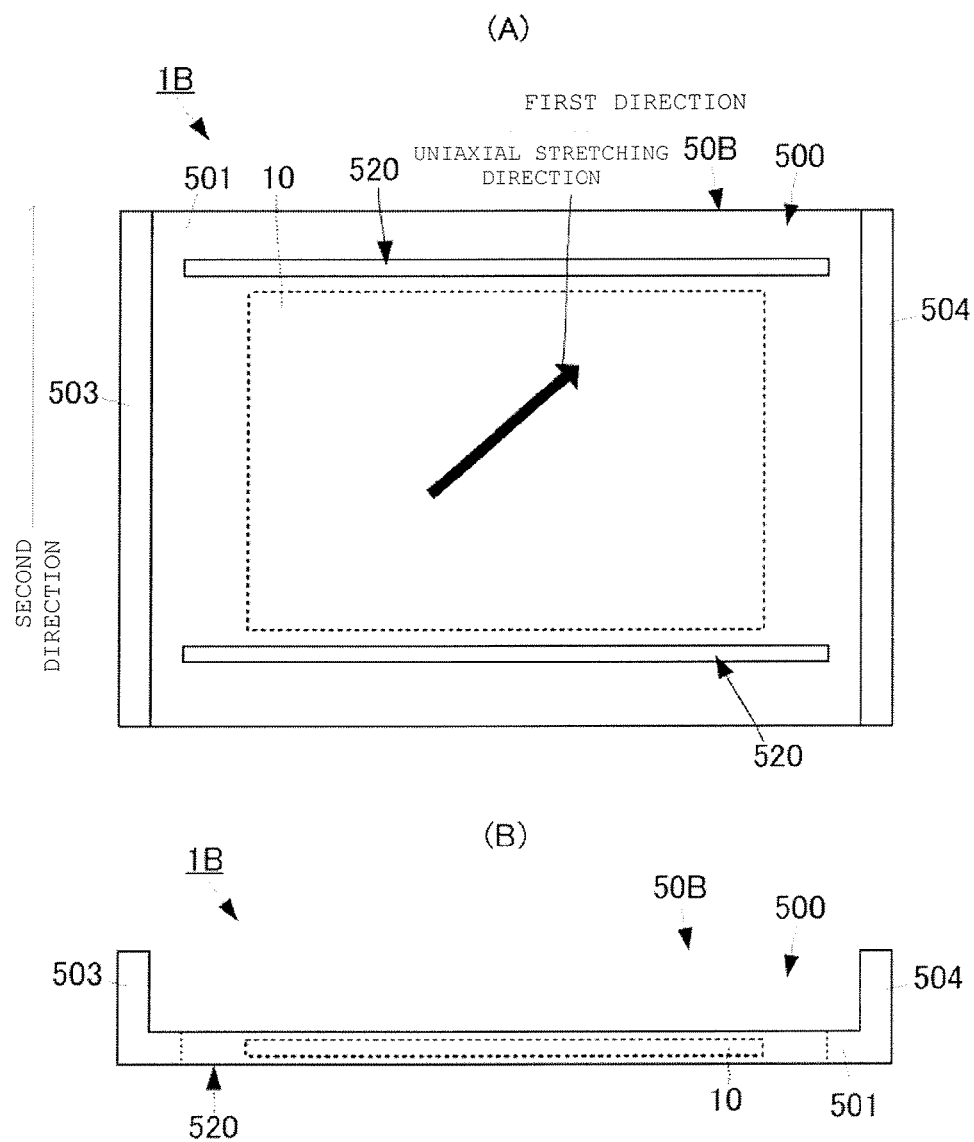
FIGS. 16(A)-(B) is an enlarged plan view and a side view illustrating a mode of a housing in an arrangement region of a piezoelectric element in the operation input device according to a third embodiment of the present invention.

As illustrated in FIG. 16, the housing 50B of the operation input device 1B according to the present embodiment has grooves 520 on both sides of a region of a base portion 501 in which the piezoelectric element 10 is arranged along the second direction. The groove 520 has a predetermined width along the second direction, and is formed into a shape which extends along the first direction. The length of the groove 520 along the first direction is formed into a shape longer than the entire first direction length of the piezoelectric element 10 (piezoelectric film 100). In addition, the first direction length may be optionally set as long as the first direction length is the same as at least the entire first direction length of the piezoelectric element 10 (piezoelectric film 100). Further, the groove 520 only needs to be formed such that both ends of the groove 520 are closer to longitudinal side portions 503 and 504 than the both ends of the piezoelectric film 100.

This configuration is employed, so that, when a region of the base portion 501 to which the piezoelectric element 10 is attached is pressed, the piezoelectric film 100 is further displaced compared to a case where the grooves 520 are not provided. Further, the piezoelectric film 100 hardly stretches along the second direction, and stretches along the first direction. Consequently, it is possible to more accurately detect the pressing amount.

Figure 17:
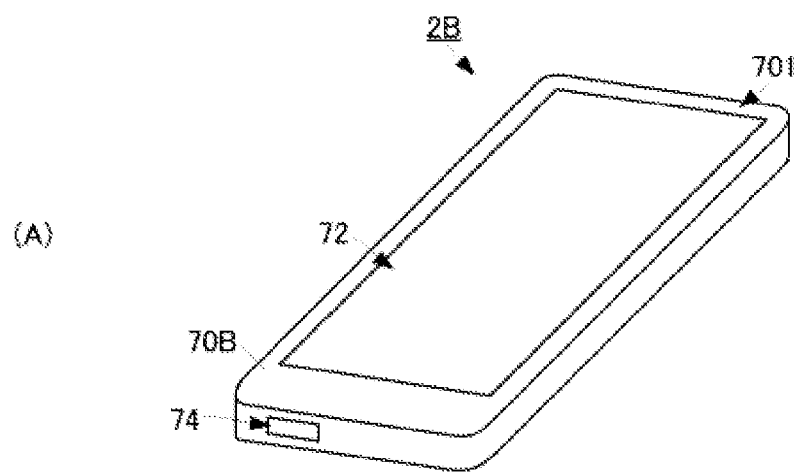
FIGS. 17(A)-(B) is a perspective view of an information display device according to a fourth embodiment of the present invention.
Figure 17:
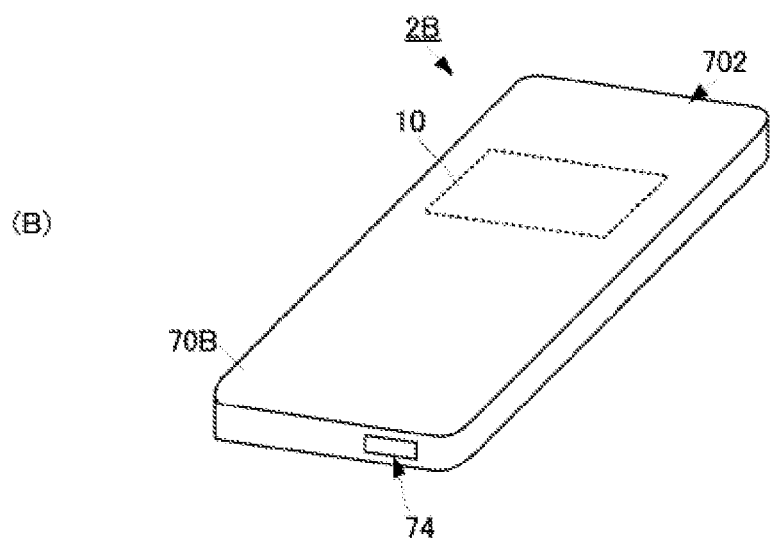

Next, an information display device according to the fourth embodiment will be described with reference to the drawings. FIG. 17 is a perspective view of the information display device according to the fourth embodiment of the present invention. FIG. 17(A) is a perspective view seen from the top surface side. FIG. 17(B) is a perspective view seen from the back surface side.

An information display device 2B according to the present embodiment is formed by integrating a pair of an information display device 2 and an operation input device 1 described in the above first embodiment with a device body 70B. In this case, the device body 70B is made of a material such as an elastomer having predetermined elasticity. Further, a display unit 72 is arranged on a surface 701 side of the device body 70B, and a piezoelectric element 10 is arranged on a back surface 702 side.

Figure 18:
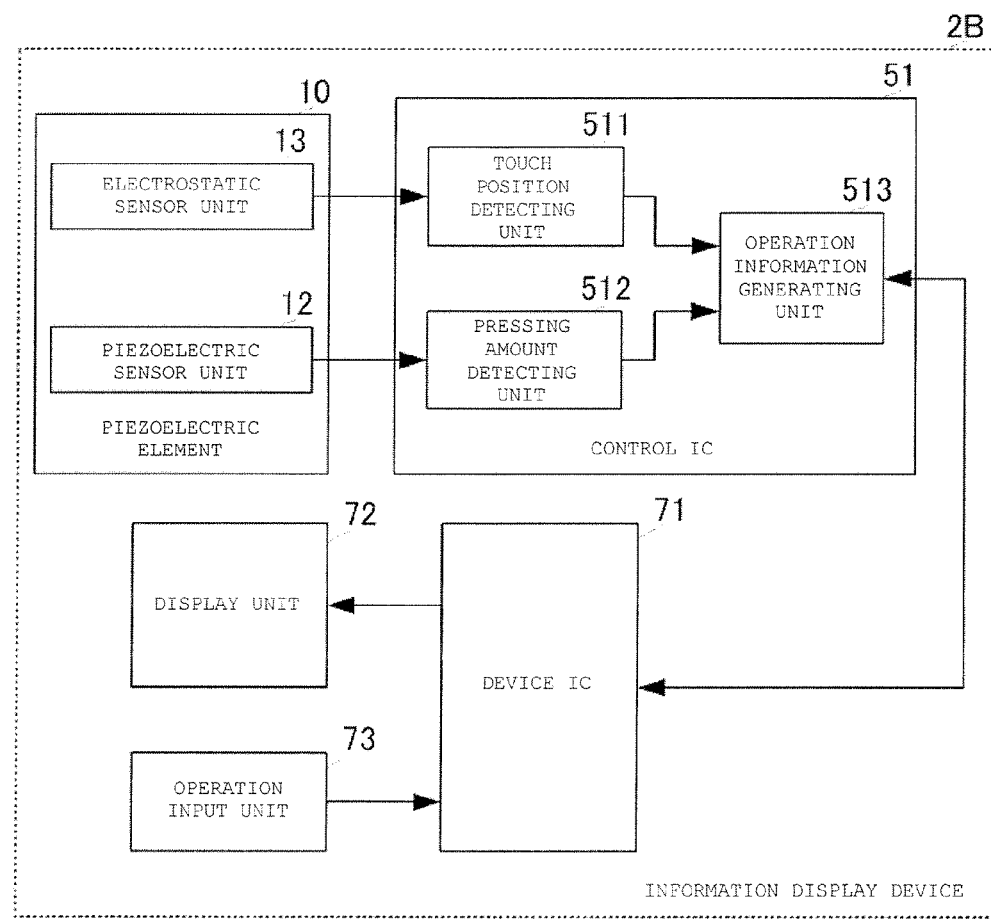
FIG. 18 is a functional block diagram of the information display device according to the fourth embodiment of the present invention.

FIG. 18 is a functional block diagram of the information display device according to the fourth embodiment of the present invention. As illustrated in FIG. 18, the information display device 2B according to the present embodiment has the piezoelectric element 10, a control IC 51, a device IC 71, the display unit 72 and an operation input unit 73. These components have the same functions as those of the first embodiment, respectively, and are integrally provided in the device body 70B which forms the information display device 2B.

By employing this configuration, it is possible to integrate the information display device and the operation input device, and simplify the entire configuration.

Figure 19:
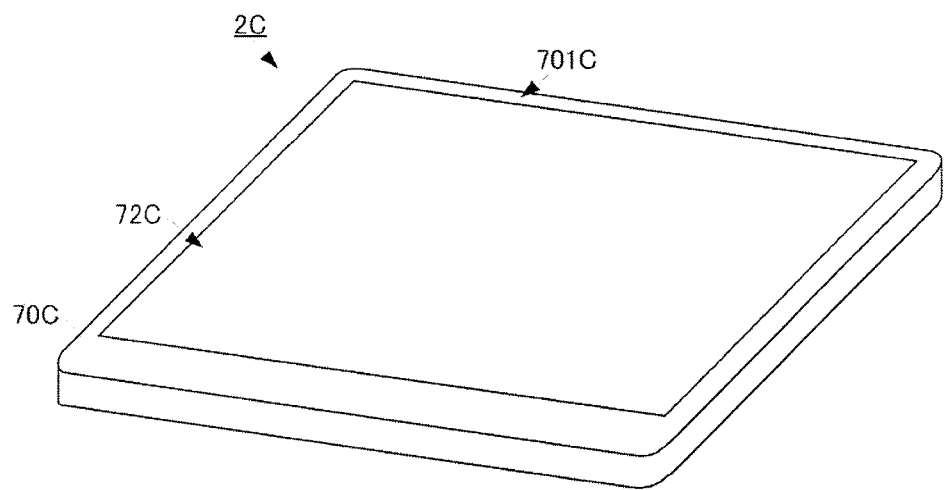
FIGS. 19(A)-(B) is a perspective view of an information display device according to a fifth embodiment of the present invention.
Figure 19:
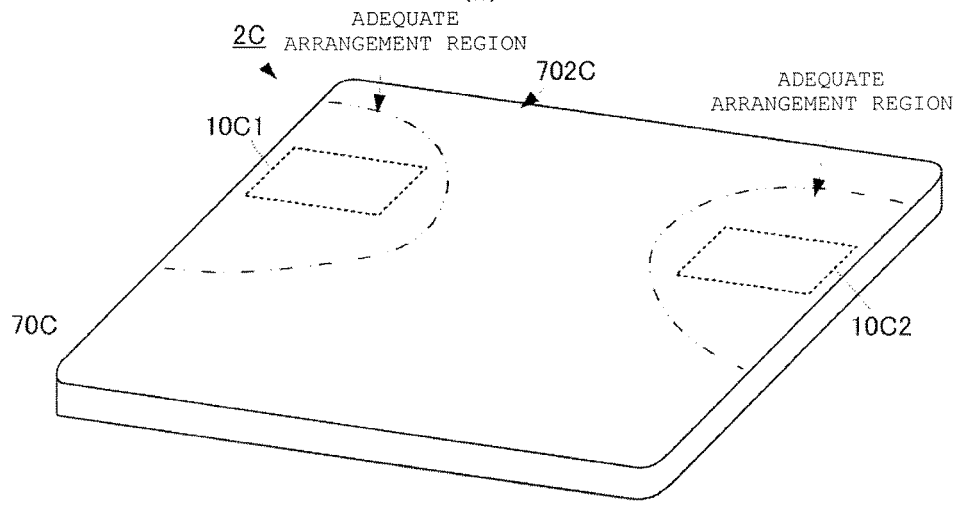

Next, an information display device according to the fifth embodiment will be described with reference to the drawings. FIG. 19 is a perspective view of the information display device according to the fifth embodiment of the present invention. FIG. 19(A) is a perspective view seen from the top surface side. FIG. 19(B) is a perspective view seen from the back surface side.

The shape of a device body 70C of an information display device 2C according to the present embodiment is larger than that of an information display device 2B according to the fourth embodiment. Accordingly, a display unit 72C is also larger.

In case of this configuration, the user may grab the device body 70C by the both hands, and therefore piezoelectric elements 10C1 and 10C2 are attached near both opposing ends in a back surface of the device body 70C. In this regard, arrangement positions of the piezoelectric elements 10C1 and 10C2 only need to be optionally set according to a mode that a general user grabs the information display device 2C. As illustrated in, for example, FIG. 19, the arrangement positions only need to be set in a predetermined region (adequate arrangement region) from the both opposing ends to the center.

Figure 20:
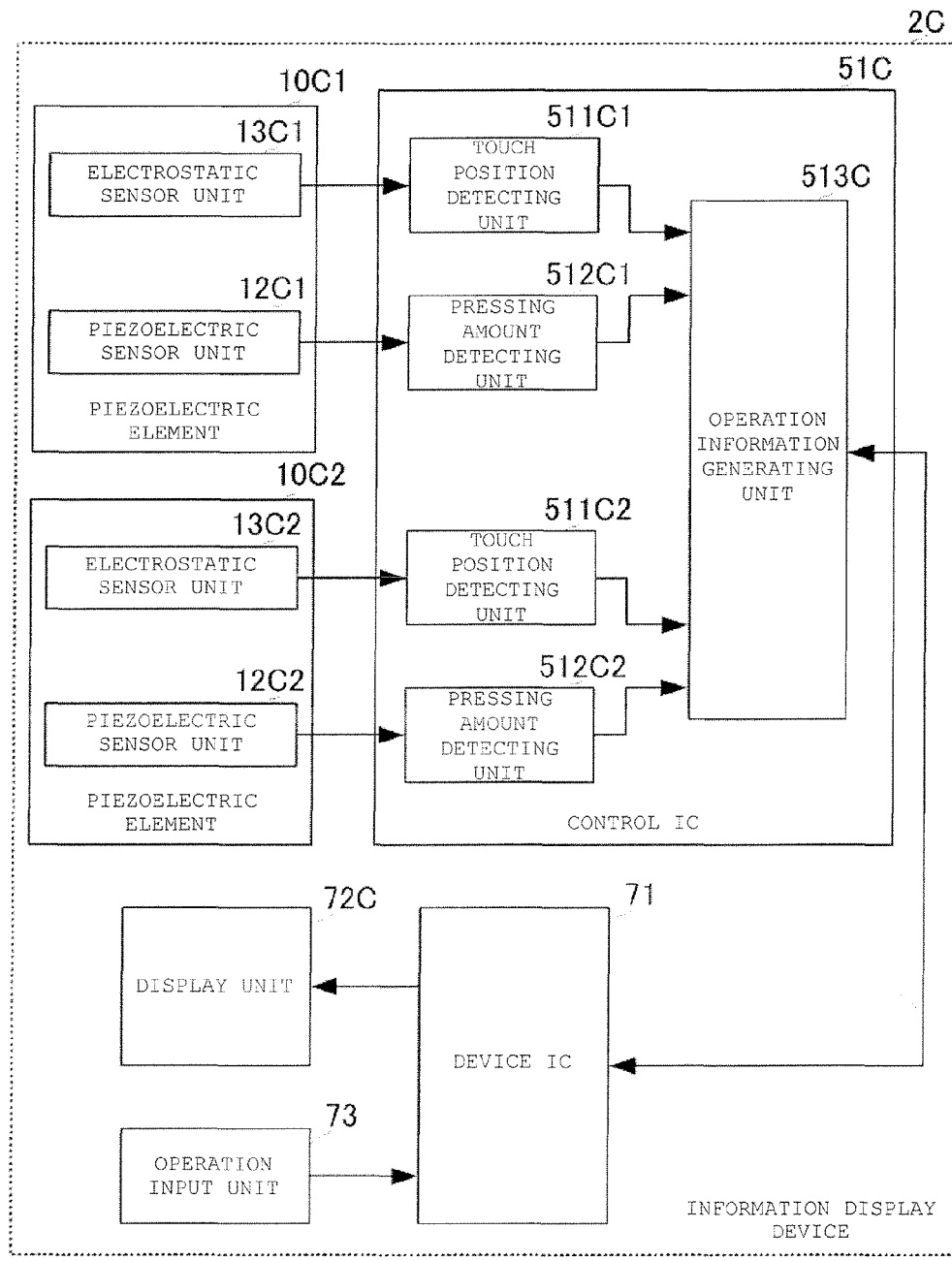
FIG. 20 is a functional block diagram of the information display device according to the fifth embodiment of the present invention.

FIG. 20 is a functional block diagram of the information display device according to the fifth embodiment of the present invention. As illustrated in FIG. 20, the information display device 2C according to the present embodiment has the piezoelectric elements 10C1 and 10C2, a control IC 51, a device IC 71, the display unit 72C and an operation input unit 73. These components have the same functions as those of the first embodiment, respectively, and are integrally provided in the device body 70C which forms the information display device 2C. The piezoelectric elements 10C1 and 10C2 have the same function as that of the piezoelectric element 10. The control IC 51C performs the same processing as that of a control IC 51 according to the first embodiment based on detection signals of the piezoelectric elements 10C1 and 10C2, and generates and outputs operation information.

Thus, in case of the information display device 2C which is grabbed by both hands, the piezoelectric elements 10C1 and 10C2 only need to be arranged for the fingers of the both hands. Further, when a plurality of piezoelectric elements is provided, it is possible to realize a complex operation input compared to a case of one piezoelectric element by combining operation information of a plurality of piezoelectric elements.

In addition, in a mode that the above information display device and operation input device are formed as separate bodies, a structure in which the operation input device is formed using a thinner film and is applied to the back surface side of the information display side may be adopted.

DESCRIPTION OF REFERENCE SYMBOLS 1, 1A, 1B: OPERATION INPUT DEVICE,
2, 2B, 2C: INFORMATION DISPLAY DEVICE,
10, 10C1, 10C2: PIEZOELECTRIC ELEMENT,
12, 12C1, 12C2: PIEZOELECTRIC SENSOR UNIT,
13, 13C1, 13C2: ELECTROSTATIC SENSOR UNIT,
11A TO 11F: FIRST WIRE ELECTRODE,
12A TO 12F: LEAD-OUT ELECTRODE,
13A TO 13L: THIRD WIRE ELECTRODE,
14: LEAD-OUT ELECTRODE,
21A TO 21F: SECOND WIRE ELECTRODE,
22A TO 22F: LEAD-OUT ELECTRODE,
23A TO 23L: FOURTH WIRE ELECTRODE,
24: LEAD-OUT ELECTRODE,
30, 40: PROTECTIVE LAYER,
50, 50A, 50B: HOUSING,
51, 51C: CONTROL IC,
52, 53: CONNECTOR CABLE,
60: INTERFACE MEMBER,
70: DEVICE BODY,
71: DEVICE IC,
72: DISPLAY UNIT,
73: OPERATION INPUT UNIT,
74: INTERFACE PORT,
100: PIEZOELECTRIC FILM,
500: CONCAVE PORTION,
501: BASE PORTION,
502: LATERAL SIDE PORTION,
503, 504: LONGITUDINAL SIDE PORTION,
510: AUXILIARY MEMBER,
511: TOUCH POSITION DETECTING UNIT,

512: PRESSING AMOUNT DETECTING UNIT,
513: OPERATION INFORMATION GENERATING UNIT,
520: GROOVE,
901: FINGER,
910: POINTER, AND
920: TARGET MARK

The invention claimed is:

1. An input device connectable to an information display device having a first surface with a display unit, the input device comprising:
a housing with a base portion;
a planar piezoelectric element attached to at least a center region of the base portion and having a piezoelectric film including opposing first and second surfaces, a first electrode disposed on the first surface and a second electrode disposed on the second surface, the piezoelectric element generating a detection signal corresponding to a position of a pressing input; and
a controller coupled to the planar piezoelectric element and configured to generate operation input information based on the detection signal,
wherein the planar piezoelectric element has a flat film shape and is parallel to a primary surface of the base portion, such that the planar piezoelectric element is arranged adjacent to a second surface of the information display device opposite the first surface when the information display device is connected to the input device,
wherein the input device is structurally configured such that a gap is formed between the information display device and at least the planar piezoelectric element when the information display device is connected to the input device, such that the base portion can be deformed by the gap towards the information display device, and
wherein the center region includes a flexible region that has a length longer than a length of the piezoelectric element and that has a higher elasticity than an elasticity of the base portion other than the flexible region.

2. The input device according to claim 1, wherein the first electrode comprises a capacitance detection electrode and the second electrode comprises a piezoelectric voltage detection electrode.

3. The input device according to claim 1, wherein the piezoelectric film comprises polylactic acid stretched in at least a uniaxial direction.

4. The input device according to claim 1, wherein the piezoelectric element is embedded inside the base portion and the gap formed between the information display device and the planar piezoelectric element completely extends on a surface of the planar piezoelectric element.

5. The input device according to claim 1, wherein the housing includes a side portion extending orthogonally from the base portion and disposed along an outer periphery of the base portion, such that the housing of the input device sandwiches the information display device when the information display device is connected to the input device.

6. The input device according to claim 5, wherein the piezoelectric element is disposed in the base portion at a position spaced a predetermined distance from the side portion.

7. The input device according to claim 1, further comprising a plurality of piezoelectric elements.

8. The input device according to claim 1, wherein the input device connects to the information display device via an interface port of the information display device.

9. The input device according to claim 1, wherein the planar piezoelectric element and the controller are disposed in substantially the same plane of the planar base portion.

10. The input device according to claim 9, wherein the base portion includes a groove extending along a periphery of the piezoelectric element.

11. An information display system comprising:
an information display device having a first surface being a touch panel with a display unit and a display control unit; and
an input device connectable to the information display device, the input device comprising:
a housing with a base portion;
a planar piezoelectric element attached to at least a center region of the base portion and having a piezoelectric film including opposing first and second surfaces, a first electrode disposed on the first surface and a second electrode disposed on the second surface, the planar piezoelectric element generating a detection signal corresponding to a position of a pressing input; and
a controller coupled to the piezoelectric element and configured to generate operation input information based on the detection signal,
wherein the planar piezoelectric element has a flat film shape and is parallel to a primary surface of the base portion, such that the planar piezoelectric element is arranged adjacent to a second surface of the information display device opposite the first surface when the information display device is connected to the input device,
wherein the input device is structurally configured such that a gap is formed between the information display device and at least the planar piezoelectric element when the information display device is connected to the input device, such that the base portion can be deformed by the gap towards the information display device, and
wherein the display control unit displays on the display unit a mark indicating an operation position based on the operation input information, and
wherein the center region includes a flexible region that has a length longer than a length of the piezoelectric element and that has a higher elasticity than an elasticity of the base portion other than the flexible region.

12. The information display system according to claim 11, wherein the display control unit changes a display mode of the mark based on a change in the operation input information.

13. The information display system according to claim 12, wherein the display control unit changes the display mode of the mark based on a change in pressing force detection information of the operation input information and enlarges a display screen on the display unit when a force of the pressing input is larger than a threshold with a center of the mark is at a center of the enlarged display screen.

14. The information display system according to claim 12, wherein the display control unit changes the display mode of the mark based on a change in position detection information of the operation input information.

15. The information display system according to claim 14, wherein the display control unit changes the display mode of the mark based on a change in pressing force detection information of the operation input information.

16. An operation input device comprising:
- a base including a planar piezoelectric element with a flat piezoelectric film parallel to a primary surface of the base and including opposing first and second surfaces, a first electrode disposed on the first surface and a second electrode disposed on the second surface, the planar piezoelectric element generating a detection signal corresponding to a position of a pressing input, wherein a center region of the base includes a flexible region that has a length longer than a length of the planar piezoelectric element and that has a higher elasticity than an elasticity of the base other than the flexible region;
- a side portion extending orthogonally from the base and disposed along an outer periphery of the base; and
- a controller communicatively coupled to the piezoelectric element and configured to generate operation input information based on the detection signal,
- wherein the input device is structurally configured such that a gap is formed between an information display device and at least the planar piezoelectric element when the information display device is connected to the input device, such that the base can be deformed by the gap towards the information display device.

17. The operation input device according to claim 16, wherein the base and the side portion define a housing to secure an information display device.

* * * * *